United States Patent
Shimizu et al.

(10) Patent No.: US 10,491,312 B1
(45) Date of Patent: Nov. 26, 2019

(54) SIMULTANEOUS RECEPTION OF VEHICLE-TO-EVERYTHING (V2X) MESSAGES OVER MULTIPLE CHANNELS IN MULTI-CHANNEL V2X NETWORKS

(71) Applicant: TOYOTA JIDOSHA KABUSHIKI KAISHA, Toyota-shi, Aichi-ken (JP)

(72) Inventors: Takayuki Shimizu, Mountain View, CA (US); Yoshiharu Doi, Tokyo (JP); Onur Altintas, Mountain View, CA (US); Roger Melen, Mountain View, CA (US); Hongsheng Lu, Mountain View, CA (US); Gaurav Bansal, Mountain View, CA (US); John Kenney, Mountain View, CA (US)

( * ) Notice: Subject to any disclaimer, the term of this patent is extended or adjusted under 35 U.S.C. 154(b) by 0 days.

(21) Appl. No.: 16/122,869

(22) Filed: Sep. 5, 2018

(51) Int. Cl.
- H04B 1/00 (2006.01)
- H04B 15/00 (2006.01)
- H04W 4/40 (2018.01)

(52) U.S. Cl.
CPC .............. *H04B 15/00* (2013.01); *H04W 4/40* (2018.02)

(58) Field of Classification Search
CPC ................................. H04B 15/00; H04W 4/40
See application file for complete search history.

(56) References Cited

U.S. PATENT DOCUMENTS

| | | | | |
|---|---|---|---|---|
| 9,689,967 | B1 * | 6/2017 | Stark ........................ | G01S 7/292 |
| 2007/0244614 | A1 * | 10/2007 | Nathanson ............. | G07C 5/008 |
| | | | | 701/33.4 |
| 2011/0028163 | A1 * | 2/2011 | Hoshihara .............. | H04B 15/04 |
| | | | | 455/456.1 |
| 2012/0083235 | A1 * | 4/2012 | Gomez ................... | H04J 11/004 |
| | | | | 455/296 |
| 2014/0349594 | A1 * | 11/2014 | Hoshihara .............. | H04B 1/109 |
| | | | | 455/77 |
| 2014/0378179 | A1 * | 12/2014 | Nagai .................... | H04W 16/14 |
| | | | | 455/509 |
| 2015/0147976 | A1 * | 5/2015 | Wang .................... | G05D 1/0022 |
| | | | | 455/65 |
| 2015/0189654 | A1 * | 7/2015 | Nakano ................. | H04W 16/14 |
| | | | | 455/450 |
| 2018/0252809 | A1 * | 9/2018 | Davis .................... | G01S 13/931 |

FOREIGN PATENT DOCUMENTS

WO    WO09147777    10/2009

* cited by examiner

*Primary Examiner* — Md K Talukder
(74) *Attorney, Agent, or Firm* — Burbage Law, P.C.; Jon-Michael Burbage; Elizabeth Ruzich

(57) ABSTRACT

The disclosure describes embodiments for reducing interference for wireless vehicular messages. In some embodiments, a method includes detecting a presence of an interference signal on a channel of a Vehicle-to-Everything (V2X) radio which obscures payload data that is included in a V2X message received via the channel. The method includes determining a source of the interference signal present on the channel. The method includes canceling out the interference signal from the V2X message using a cancellation sequence selected based on the source to generate a modified version of the V2X message including the payload data which is substantially unobscured by the interference signal. The method includes providing the modified version of the V2X message to a vehicle component so that the vehicle component provides its functionality based on the payload data and not the interference signal.

20 Claims, 16 Drawing Sheets

SIMULTANEOUS RECEPTION OF VEHICLE-TO-EVERYTHING (V2X) MESSAGES OVER MULTIPLE CHANNELS IN MULTI-CHANNEL V2X NETWORKS

BACKGROUND

The specification relates to reducing interference for wireless vehicular messages. More particularly, embodiments of the specification relate to simultaneous reception of vehicle-to-everything (V2X) messages over multiple channels in multi-channel V2X networks.

V2X communication is increasingly being included in vehicles because, for example, it is a source of sensor data which is required for many Advanced Driver Assistance Systems (herein "ADAS system" if singular, "ADAS systems" if plural) or autonomous driving systems to provide their functionality. Modern vehicles are equipped with one or more V2X radios that include multiple V2X channels that are used to send and receive V2X messages using a variety of different protocols.

In some scenarios, these V2X communications are used to send and receive wireless data (e.g., sensor data) which is shared among vehicles and infrastructure devices (e.g., roadside units). Accurate and complete reception of the wireless data included in these V2X messages is helpful for proper functioning of the ADAS systems and automated driving systems. An obstacle to providing accurate and complete reception of wireless data transmitted via V2X messages includes the following types of interference which are created by frequent or nearly constant transmission and reception of V2X messages using multiple V2X channels: adjacent channel interference, self-interference, and combination interference which includes a combination of the adjacent channel interference and the self-interference.

An existing solution for reducing interference that impedes V2X communications is to increase an energy level of V2X messages such that the V2X messages can be "heard" even though the interference is present. This solution is not adequate since in practice it still results in some V2X messages not being heard by an intended recipient due to, e.g., intense adjacent-channel interference, intense self-interference, or a combination thereof.

SUMMARY

Described herein are embodiments an interference reduction system that is an element of a connected vehicle. The interference reduction system beneficially solves the problem of adjacent channel interference, self-interference and combination interference for the connected vehicle by using a cancellation sequence to eliminate (or greatly reduce) the adjacent channel interference, the self-interference and the combination interference such that wireless messages can be clearly and accurately received on different neighboring channels without the need to increase the energy level of the wireless messages. There is no existing solution that provides the functionality of eliminating adjacent channel interference, self-interference, and combination interference for V2X communications.

For clarity and convenience, the functionality of the embodiments of the interference reduction system is described herein with reference to Vehicle-to-Everything (V2X) messages. However, in practice the interference reduction system can also be operable to reduce or eliminate interference for any type of wireless messages for unlicensed band communications (e.g., wireless messages from WiFi, LTE-U, LTE-LAA, etc.). For example, the interference reduction system is operable to reduce or eliminate adjacent channel interference, self-interference, and combination interference for any type of wireless communication protocols described below with reference to the network 105 or the communication unit 145.

In some embodiments, the interference reduction system is operable to analyze any received V2X messages and cancel out any interference signal that is preventing these V2X messages from being clearly and accurately received (other suitable terms for "received" include "observed" or "heard"). The interference signal may include adjacent channel interference, self-interference, and combination interference. In some embodiments, the interference reduction system is operable to utilize a cancellation sequence to cancel out any interference signal present on a particular V2X channel based on a source of the interference signal. In particular, the cancellation sequence applied herein is dynamically variable based on the following: whether the source of the interference signal present on the given V2X channel is on-board the V2X radio (e.g., a type of the interference signal is self-interference); whether the source of the interference signal present on the given V2X channel is off-board the V2X radio (e.g., a type of the interference signal is adjacent channel interference); or whether the source of the interference signal present on the given V2X channel is both (1) on-board the V2X radio and (2) off-board the V2X radio (e.g., a type of the interference signal is "combination interference"). There is no existing solution that provides the functionality of applying a cancellation sequence that is dynamically variable for interference cancellation based on a source of an interference signal present on a V2X channel of a V2X radio of a connected vehicle.

For example, a connected vehicle receives V2X messages across multiple channels of a V2X radio configured on the connected vehicle. For each V2X channel of the V2X radio, the interference reduction system is operable to perform operations including, but not limited to, the following: (1) detecting whether an interference signal is present on a channel of a V2X radio which obscures payload data that is included in a V2X message received via the channel; (2) determining a source of the interference signal present on the channel of the V2X radio; and (3) canceling out the interference signal from the V2X message using a cancellation sequence selected based on the source so that the V2X message for this particular V2X channel is clearly and accurately received by the V2X radio.

In some embodiments, the interference reduction system includes a feedback loop that analyzes the performance of the cancellation sequence being applied and selects an optimal sequence (or an optimal execution order) for future application. For example, the sequence of interference cancellation techniques applied by the interference reduction system is dynamically variable based on whether the source of the interference present on any given V2X channels on-board (e.g., self-interference) or off-board (e.g., adjacent channel interference). In some embodiments, the analysis for selecting the optimal sequence includes selecting the optimal sequence based on one or more of: (1) how quickly the sequence has been historically applied; and (2) how successful the historical cancellations are determined to have been. Optionally, the interference reduction system is operable to apply a learning algorithm to modify the cancellation sequence and maximize the performance of the cancellation sequence.

An additional benefit of the interference reduction system includes that it enables full-duplex communication by a single V2X radio using different neighboring channels for transmission and reception. In this aspect, application of the interference reduction system is particularly advantageous for DSRC messaging applications because of the DSRC protocol's inclusion of Basic Safety Messages being transmitted at regular short intervals (e.g., once every 0.10 seconds). However, it should be understood that application of the interference reduction system can also benefit any V2X communication that is negatively affected by adjacent channel interference, self-interference, and combination interference.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: detecting a presence of an interference signal on a channel of a Vehicle-to-Everything (V2X) radio which obscures payload data that is included in a V2X message received via the channel; determining a source of the interference signal present on the channel; canceling out the interference signal from the V2X message using a cancellation sequence selected based on the source to generate a modified version of the V2X message including the payload data which is substantially unobscured by the interference signal; and providing the modified version of the V2X message to a vehicle component so that the vehicle component provides its functionality based on the payload data and not the interference signal. Other embodiments of this aspect include corresponding computer systems, apparatus, and computer programs recorded on one or more computer storage devices, each configured to perform the actions of the methods.

Implementations may include one or more of the following features. The method where the source of the interference signal is on-board the V2X radio and the method includes determining that a type of the interference signal is self-interference. The method where the cancellation sequence includes applying a self-interference cancellation technique to cancel out the self-interference from the V2X message. The method where the source of the interference is off-board the V2X radio and the method includes determining that a type of the interference signal is adjacent channel interference. The method where the cancellation sequence includes applying an adjacent-channel-interference cancellation technique to cancel out the adjacent channel interference from the V2X message. The method where the source of the interference is on-board and off-board the V2X radio and the method includes determining that a type of the interference signal is combination interference. The method where the cancellation sequence includes: determining an execution order to cancel out the self-interference and the adjacent channel interference from the V2X message based on one or more order determination factors; if the execution order indicates to cancel out the self-interference prior to the adjacent channel interference, applying the self-interference cancellation technique to cancel out the self-interference from the V2X message to generate a first intermediate version of the V2X message, and applying the adjacent-channel-interference cancellation technique to cancel out the adjacent channel interference from the first intermediate version of the V2X message to generate the modified version of the V2X message; and if the execution order indicates to cancel out the adjacent channel interference prior to the self-interference, applying the adjacent-channel-interference cancellation technique to cancel out the adjacent channel interference from the V2X message to generate a second intermediate version of the V2X message, and applying the self-interference cancellation technique to cancel out the self-interference from the second intermediate version of the V2X message to generate the modified version of the V2X message. The method where the one or more order determination factors include at least one of a strength of the self-interference, a strength of the adjacent channel interference, and a source of a maximal interference from the self-interference and the adjacent channel interference. The method further comprising: analyzing interference cancellation performance associated with the V2X message; providing feedback data based on an analysis result of the interference cancellation performance; and updating the cancellation sequence based on the feedback data. Implementations of the described techniques may include hardware, a method or process, or computer software on a computer-accessible medium.

One general aspect includes a system including: a processor communicatively coupled to a V2X radio and non-transitory memory, where the V2X radio is operable to receive a V2X message on a channel of the V2X radio and the non-transitory memory stores computer code that is operable, when executed by the processor, to cause the processor to: detect a presence of an interference signal on a channel of a Vehicle-to-Everything (V2X) radio which obscures payload data that is included in a V2X message received via the channel; determine a source of the interference signal present on the channel; cancel out the interference signal from the V2X message using a cancellation sequence selected based on the source to generate a modified version of the V2X message including the payload data which is substantially unobscured by the interference signal; and provide the modified version of the V2X message to a vehicle component so that the vehicle component provides its functionality based on the payload data and not the interference signal. Other embodiments of this aspect include corresponding computer systems, apparatus, and computer programs recorded on one or more computer storage devices, each configured to perform the actions of the methods.

Implementations may include one or more of the following features. The system where: the source of the interference signal is on-board the V2X radio and a type of the interference signal is self-interference; and the cancellation sequence includes applying a self-interference cancellation technique to cancel out the self-interference from the V2X message. The system where: the source of the interference is off-board the V2X radio and a type of the interference signal is adjacent channel interference; and the cancellation sequence includes applying an adjacent-channel-interference cancellation technique to cancel out the adjacent channel interference from the V2X message. The system where: the source of the interference is on-board and off-board the V2X radio and a type of the interference signal is combination interference; and the cancellation sequence includes a combination of applying a self-interference cancellation technique and an adjacent-channel-interference cancellation technique to cancel out any self-interference and any adjacent channel interference from the V2X message respectively. The system where the cancellation sequence includes: determining an execution order to cancel out the self-interference and the adjacent channel interference from the V2X message based on one or more order determination factors; if the execution order indicates to cancel out the self-interference prior to the adjacent channel interference, applying the self-interference cancellation technique to cancel out the self-interference from the V2X message to generate a first intermediate version of the V2X message, and applying the adjacent-channel-interference cancellation technique to cancel out the adjacent channel interference from the first intermediate version of the V2X message to generate the modified version of the V2X message; and if the execution order indicates to cancel out the adjacent channel interference prior to the self-interference, applying the adjacent-channel-interference cancellation technique to cancel out the adjacent channel interference from the V2X message to generate a second intermediate version of the V2X message, and applying the self-interference cancellation technique to cancel out the self-interference from the second intermediate version of the V2X message to generate the modified version of the V2X message. Implementations of the described techniques may include hardware, a method or process, or computer software on a computer-accessible medium.

One general aspect includes a computer program product including instructions that, when executed by a processor, causes the processor to perform operations including: detecting a presence of an interference signal on a channel of a Vehicle-to-Everything (V2X) radio which obscures payload data that is included in a V2X message received via the channel; determining a source of the interference signal present on the channel; canceling out the interference signal from the V2X message using a cancellation sequence selected based on the source to generate a modified version of the V2X message including the payload data which is substantially unobscured by the interference signal; and providing the modified version of the V2X message to a vehicle component so that the vehicle component provides its functionality based on the payload data and not the interference signal. Other embodiments of this aspect include corresponding computer systems, apparatus, and computer programs recorded on one or more computer storage devices, each configured to perform the actions of the methods.

Implementations may include one or more of the following features. The computer program product where: the source of the interference signal is on-board the V2X radio and a type of the interference signal is self-interference; and the cancellation sequence includes applying a self-interference cancellation technique to cancel out the self-interference from the V2X message. The computer program product where: the source of the interference is off-board the V2X radio and a type of the interference signal is adjacent channel interference; and the cancellation sequence includes applying an adjacent-channel-interference cancellation technique to cancel out the adjacent channel interference from the V2X message. The computer program product where: the source of the interference is on-board and off-board the V2X radio and a type of the interference signal is combination interference; and the cancellation sequence includes a combination of applying a self-interference cancellation technique and an adjacent-channel-interference cancellation technique to cancel out any self-interference and any adjacent channel interference from the V2X message respectively. The computer program product where the cancellation sequence includes: determining an execution order to cancel out the self-interference and the adjacent channel interference from the V2X message based on one or more order determination factors; if the execution order indicates to cancel out the self-interference prior to the adjacent channel interference, applying the self-interference cancellation technique to cancel out the self-interference from the V2X message to generate a first intermediate version of the V2X message, and applying the adjacent-channel-interference cancellation technique to cancel out the adjacent channel interference from the first intermediate version of the V2X message to generate the modified version of the V2X message; and if the execution order indicates to cancel out the adjacent channel interference prior to the self-interference, applying the adjacent-channel-interference cancellation technique to cancel out the adjacent channel interference from the V2X message to generate a second intermediate version of the V2X message, and applying the self-interference cancellation technique to cancel out the self-interference from the second intermediate version of the V2X message to generate the modified version of the V2X message. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
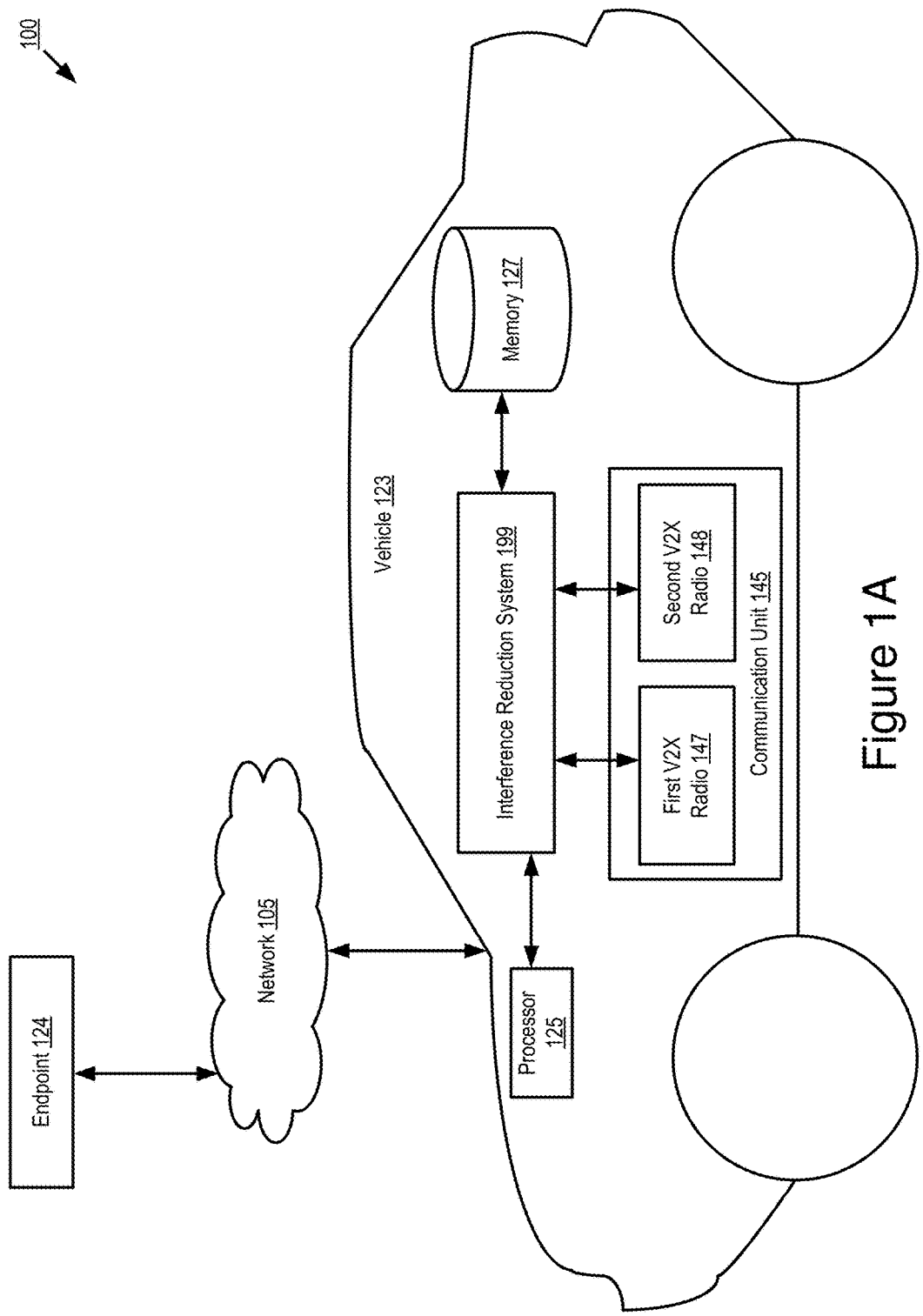
FIG. 1A is a block diagram illustrating an operating environment for an interference reduction system according to some embodiments.

Embodiments of an interference reduction system that are operable to reduce or eliminate interference for V2X communications are now described. Examples of V2X communications include one or more of the following: DSRC (including Basic Safety Messages (BSMs) and Pedestrian Safety Messages (PSMs), among other types of DSRC communication); LTE; millimeter wave communication; 3G; 4G; 5G LTE-Vehicle-to-Everything (LTE-V2X); LTE-Vehicle-to-Vehicle (LTE-V2V); LTE-Device-to-Device (LTE-D2D); Voice over LTE (VoLTE); etc. In some embodiments, the interference reduction system described herein may also be operable to reduce or eliminate interference for unlicensed band communications (e.g., WiFi, LTE-U, LTE-LAA, etc.).

In some embodiments, the connected vehicle that includes the interference reduction system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

Although the interference reduction system is described herein at times with reference to DSRC messages and DSRC channels, the interference reduction system is not limited to working with DSRC protocol messages and improves the ability to receive, or "hear," any type of V2X message which is negatively affected by adjacent-channel interference, self-interference, or combination interference.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in basic safety message (BSM) data that is transmitted by the DSRC radio of the RSU. In this way, the RSU does not include a DSRC-compliant GPS unit but is still operable to distribute BSM data that satisfies the requirements for the DSRC standard.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

In some embodiments, an interference reduction system is installed in an electronic control unit (ECU) of a connected vehicle that includes a multiple channel V2X radio. The interference reduction system includes code and routines are stored on a non-transitory memory of the ECU. The code and routines are operable, when executed by the ECU, to cause the ECU to execute the following steps for each channel of the multiple channel V2X radio: (1) determine a type of interference being experienced; (2) if the type of interference at step 1 is adjacent channel interference, the interference reduction system estimates the adjacent-channel interference waveform which would be caused by V2X messages for neighboring channels and then cancels out this adjacent-channel interference waveform (or reduces it) for the neighboring channels so that V2X messages on these neighboring channels can be clearly heard by a V2X radio of the connected vehicle without the need to increase the energy level for these V2X messages; (3) if the type of interference at step 1 is self-interference, the interference reduction system knows the self-interference waveform [i.e., because the connected vehicle's own V2X radio is transmitting the V2X message(s) that is causing the self-interference] which would be caused by V2X messages for other channels and cancels out this self-interference waveform (or reduces it) for the other channels so that V2X messages on these other channels can be clearly heard by a V2X radio of the connected vehicle without the need to increase the energy level for these V2X messages; and (4) if the type of interference at step 1 is combination interference, then the interference reduction system applies a sequence of successive interference cancellation which is operable to cancel out the adjacent channel interference so that the V2X message for this particular V2X channel is clearly and accurately received without the need to increase the energy level for these messages. The sequence of successive interference cancellation techniques is a combination of steps 2 and 3 described above in this paragraph. Step 4 includes two sub-steps which are defined below in the next three paragraphs. These sub-steps include reference steps 2 and 4 described above in this paragraph.

The sequence of successive interference cancellation techniques is now defined, according to some embodiments, by reference to sub-steps for step 4 which is described in the preceding paragraph. The order in which these techniques is applied within the sequence is based on variables such as which interfering signal is stronger and whether the interfering signal is due to an on-board or an off-board source.

A first sub-step includes the following example features. In some embodiments, if the strongest interfering signal has an off-board source, then the sequence of successive interference cancellation techniques includes the interference reduction system applying step 2 and then step 3 to mitigate combination interference. The sequence of successive interference cancellation techniques may be updated based on the historical performance of the sequence based on both (1) how long it takes to cancel out the interfering signals and (2) how well the sequence has performed historically.

A second sub-step includes the following example features. In some embodiments, if the strongest interfering signal has an on-board source, then the sequence of successive interference cancellation techniques includes the interference reduction system applying step 3 and then step 2 to mitigate the combination interference. The sequence of successive interference cancellation techniques may be updated based on the historical performance of the sequence based on both (1) how long it takes to cancel out the interfering signals and (2) how well the sequence has performed historically.

Figure 6A:
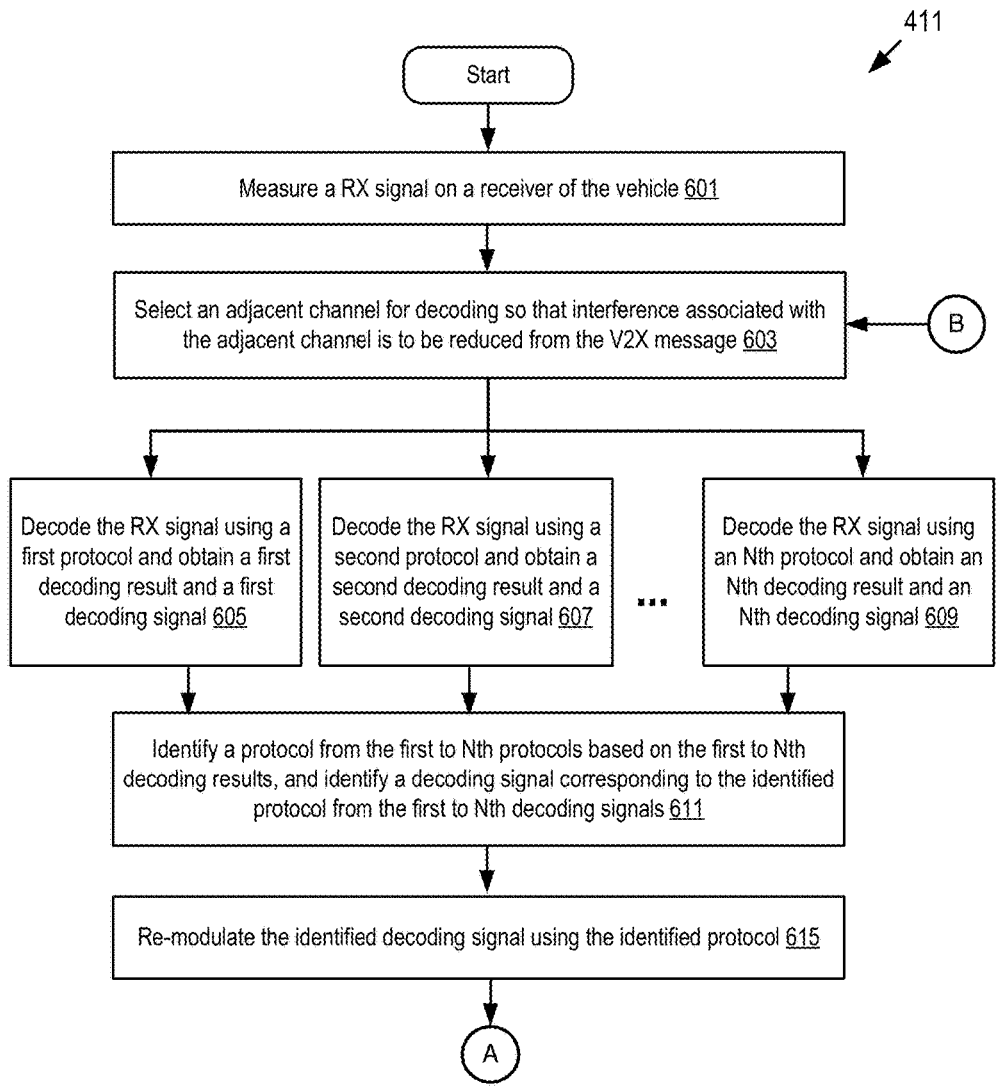
FIGS. 6A and 6B depicts a method for applying an adjacent-channel-interference cancellation technique to reduce adjacent channel interference from a V2X message according to some embodiments.
Figure 6B:
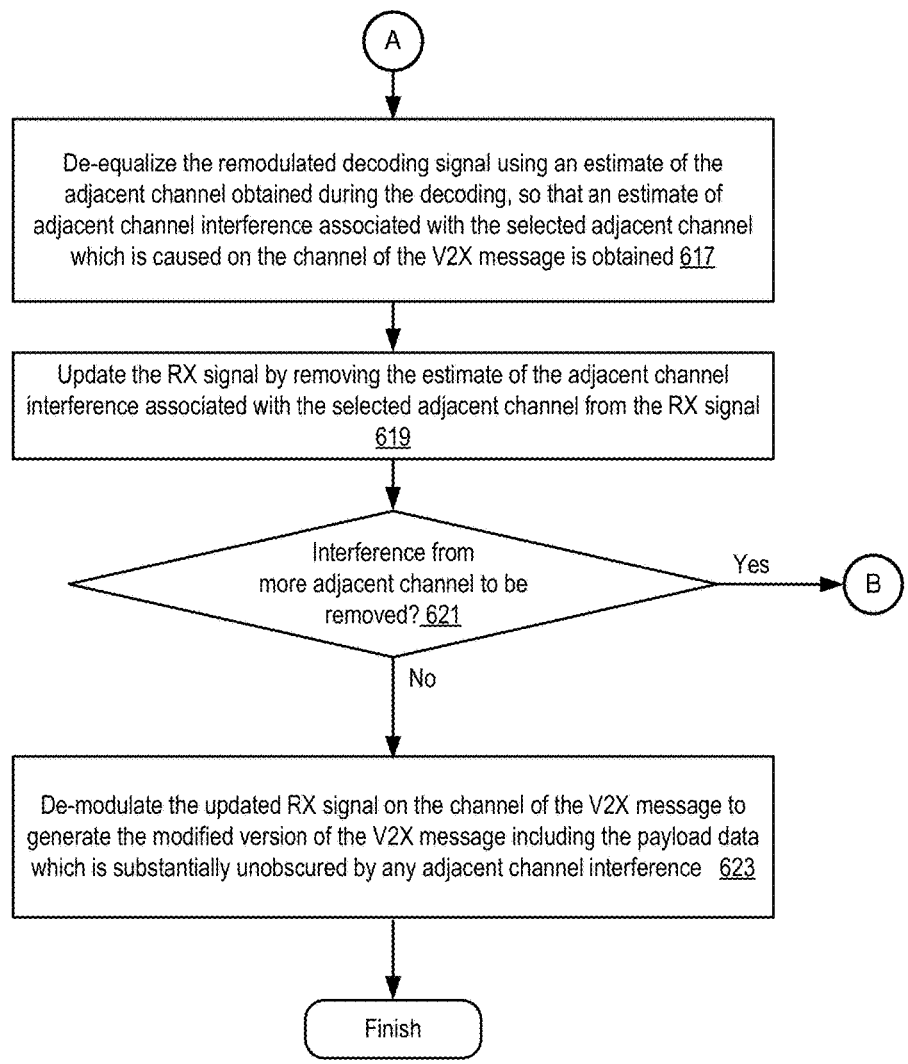

In some embodiments, FIG. 6A is a first example of a sequence of successive interference cancellation techniques. In some embodiments, FIG. 6B is a second example of a sequence of successive interference cancellation techniques.

Selected terminology is now described according to some embodiments. A "V2X event" includes one or more of the following: a V2X transmission on one of the multiple channels of the V2X radio of a connected vehicle; and a V2X reception on one of these multiple channels. Interference data includes digital data that describes the interference present on particular V2X channel during a V2X event. The interference data describes a waveform which is the interference present on a particular V2X channel during a V2X event. Examples of the types of V2X messages which are improved by interference reduction system include one or more of the following: DSRC messages; millimeter wave (mmWave) messages; V2X-LTE messages; V2X-5G messages; and any type of cellular-based V2X communication.

Referring to FIG. 1A, depicted is an operating environment 100 for an interference reduction system 199 according to some embodiments. As depicted, the operating environment 100 includes the following elements: a vehicle 123; and an endpoint 124. These elements are communicatively coupled to one another by a network 105.

Although one vehicle 123, one endpoint 124, and one network 105 are depicted in FIG. 1A, in practice the operating environment 100 may include one or more vehicles 123, one or more endpoints 124, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, LTE-5G or any other mobile data network or combination of mobile data networks. Further, the network 105 may include one or more IEEE 802.11 wireless networks.

The following are endpoints of the network 105: the vehicles 123; and the endpoint 124.

The vehicle 123 is any type of connected vehicle. For example, the vehicle 123 is one of the following types of vehicles: a car; a truck; a sports utility vehicle; a bus; a semi-truck; a robotic car; a drone or any other roadway-based conveyance. In some embodiments, the vehicle 123 is a DSRC-equipped vehicle.

In some embodiments, the vehicle 123 is an autonomous vehicle or a semi-autonomous vehicle. For example, the vehicle 123 includes a set of Advanced Driver Assistance Systems (a set of "ADAS systems") which provide autonomous features to the vehicle 123 which are sufficient to render the vehicle 123 an autonomous vehicle.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems installed in a vehicle have no vehicle control. The set of ADAS systems may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the vehicle 123 includes the following elements: a processor 125; a memory 127; a communication unit 145; and an interference reduction system 199.

In some embodiments, the processor 125 and the memory 127 may be elements of an on-board vehicle computer system (such as computer system 200 described below with reference to FIG. 2). The on-board vehicle computer system may be operable to cause or control the operation of the interference reduction system 199 of the vehicle 123. The on-board vehicle computer system may be operable to access and execute the data stored on the memory 127 to provide the functionality described herein for the interference reduction system 199 of the vehicle 123 or its elements (see, e.g., FIG. 2). The on-board vehicle computer system may be operable to execute the interference reduction system 199 which causes the on-board vehicle computer system to execute one or more steps of methods 300 and 400 described below with reference to FIGS. 3-7.

In some embodiments, the processor 125 and the memory 127 may be elements of an on-board unit. The on-board unit includes an electronic control unit (herein "ECU") or an on-board vehicle computer system that may be operable to cause or control the operation of the interference reduction system 199. The on-board unit may be operable to access and execute the data stored on the memory 127 to provide the functionality described herein for the interference reduction system 199 or its elements. The on-board unit may be operable to execute the interference reduction system 199 which causes the on-board unit to execute one or more steps of the methods 300 and 400 described below with reference to FIGS. 3-7. In some embodiments, the computer system 200 depicted in FIG. 2 is an example of an on-board unit.

In some embodiments, the vehicle 123 may include a sensor set. The sensor set may include one or more sensors that are operable to measure the physical environment outside of the vehicle 123. For example, the sensor set may include one or more sensors that record one or more physical characteristics of the physical environment that is proximate to the vehicle 123. The memory 127 may store sensor data that describes the one or more physical characteristics recorded by the sensor set.

In some embodiments, the sensor set of the vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The vehicle 123 may include one or more memories 127.

In some embodiments, the memory 127 stores, as digital data, any data described herein. In some embodiments, the memory 127 stores any data that is necessary for the interference reduction system 199 to provide its functionality.

The communication unit 145 transmits and receives data to and from a network 105 or to another communication channel. In some embodiments, the communication unit 145 may include a DSRC transceiver, a DSRC receiver and other hardware or software necessary to make the vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes: a first V2X radio 147; and a second V2X radio 148.

The first V2X radio 147 is an electronic device that includes a V2X transmitter and a V2X receiver that is operable to send and receive wireless messages via any V2X protocol. For example, the first V2X radio 147 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The first V2X radio 147 includes seven channels (e.g., DSRC channel numbers 172, 174, 176, 178, 180, 182 and 184) with at least one of these channels reserved for sending and receiving BSMs (e.g., DSRC channel number 172 is reserved for BSMs).

Vehicles that are equipped with DSRC radios transmit a BSM at a periodic interval (e.g., once every 0.10 seconds or some other time interval which is user-configurable, or configurable by the interference reduction system whenever the vehicle is parked). BSMs include a payload that includes of BSM data. BSM data is digital data that describes, among other things, one or more of the following: the path history of the vehicle which transmits the BSM; a geographic location of the transmitting vehicle with an accuracy of plus or minus 1.5 meters relative to the actual location of the transmitting vehicle; and a heading or trajectory of the transmitting vehicle.

In some embodiments, at least one of these channels is reserved for sending and receiving PSMs as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs. In some embodiments, DSRC channel number 176 is reserved for sending and receiving PSMs. PSMs include a payload that includes PSM data. PSMs are also described in U.S. patent application Ser. No. 15/640,352 filed on Jun. 6, 2017 and entitled "Optimization of a Motion Profile for a Vehicle," the entirety of which is herein incorporated by reference.

In some embodiments, the first V2X radio 147 includes a non-transitory memory which stores digital data that controls the frequency for broadcasting BSMs. In some embodiments, the non-transitory memory stores a buffered version of the GPS data for the vehicle 123 so that the GPS data for the vehicle 123 is broadcast as an element of the BSMs which are regularly broadcast by the first V2X radio 147.

In some embodiments, the first V2X radio 147 includes any hardware or software which is necessary to make the vehicle 123 compliant with the DSRC standards. In some embodiments, the DSRC-compliant GPS unit 250 depicted in FIG. 2 is an element of the first V2X radio 147.

The second V2X radio 148 is an electronic device that includes a V2X transmitter and a V2X receiver that is operable to send and receive wireless messages via any V2X protocol. The second V2X radio 148 provides functionality that is similar to the first V2X radio 147, and so, that description will not be repeated here.

Figure 1B:
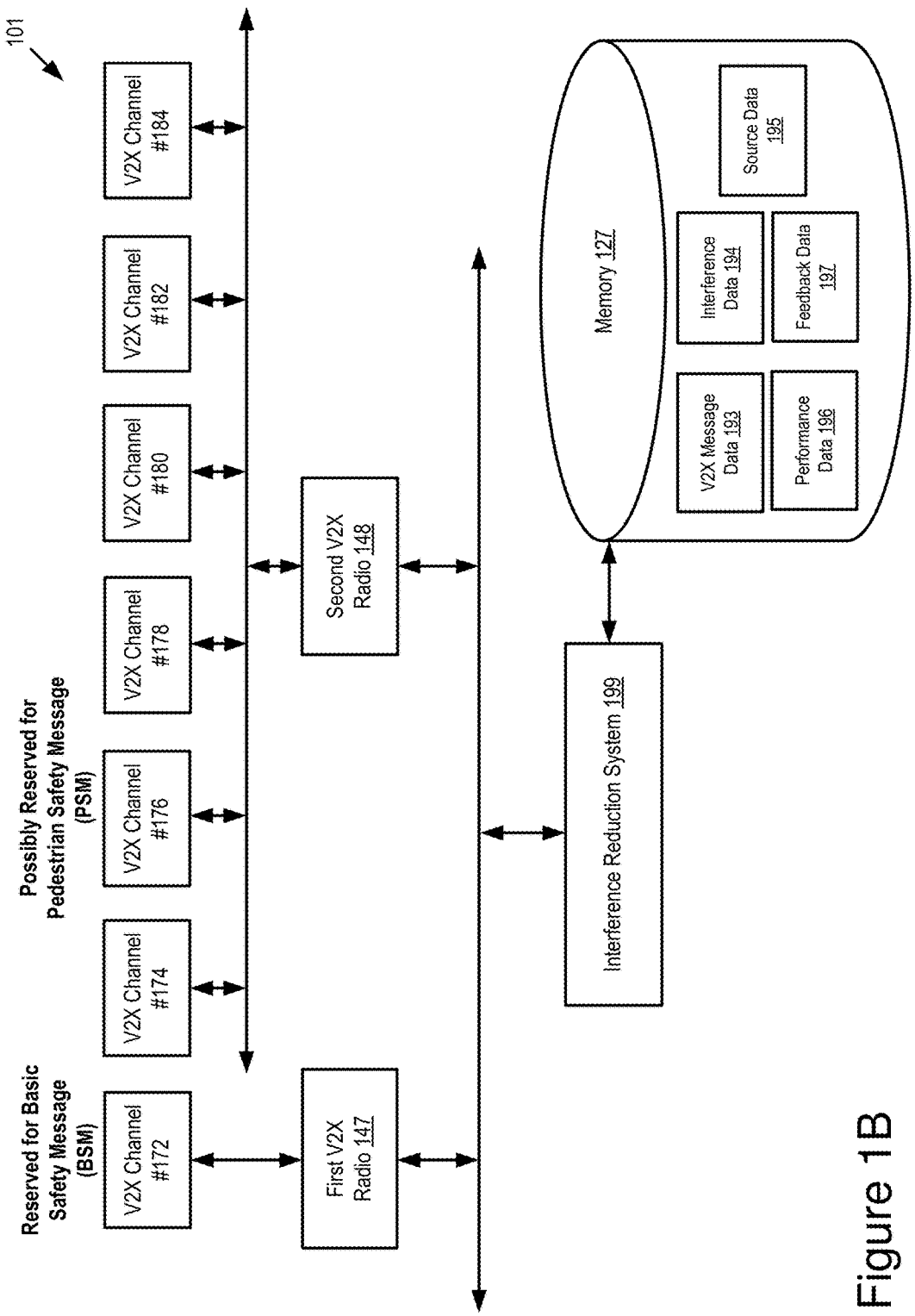
FIG. 1B is a block diagram illustrating a set of V2X radios and an interference reduction system according to some embodiments.

In some embodiments, the first V2X radio 147 includes a single channel that is dedicated to sending and/or receiving a particular type of wireless message. For example, the first V2X radio 147 includes a single channel that is dedicated to sending and receiving BSMs. See, for example, FIG. 1B in which the first V2X radio 147 includes channel 172 which is dedicated to sending and receiving BSMs. In some embodiments, the first V2X radio 147 includes a single channel that is dedicated to sending and receiving BSMs and the second V2X radio 148 includes a plurality of other channels that are operable to send and receive any V2X messages that are not BSMs. For example, the second V2X radio 148 includes six other channels as depicted in FIG. 1B that are operable to send and receive any V2X messages that are not BSMs.

In another example, the first V2X radio 147 includes a single channel that is dedicated to receiving PSMs and the second V2X radio 148 includes a plurality of other channels that are operable to send and receive any V2X messages that are not PSMs.

In some embodiments, the first V2X radio 147 is a first DSRC radio dedicated to sending and receiving BSMs. The first V2X radio 147 includes a first DSRC radio transceiver. The second V2X radio 148 is a second DSRC radio that sends and receives any DSRC messages which are not BSMs. The second V2X radio 148 includes a second DSRC radio transceiver. Accordingly, in some embodiments the vehicle 123 is a DSRC-enabled vehicle that includes two different DSRC radios.

In some embodiments, the interference reduction system 199 includes software that is operable, when executed by the processor 125, to cause the processor 125 to execute one or more steps of the methods 300 and 400 described below with reference to FIGS. 3-7. The functionality of the interference reduction system 199 is described in more detail below according to some embodiments.

In some embodiments, the interference reduction system 199 is implemented using hardware including a field-programmable gate array ("FPGA") or an application-specific integrated circuit ("ASIC"). In some other embodiments, the interference reduction system 199 implemented using a combination of hardware and software.

The endpoint 124 is any electronic device that is operable to send and receive V2X communications. For example, the endpoint 124 is an electronic device, or another connected vehicle, including a communication unit similar to the communication unit 145. In some embodiments, the endpoint 124 is a smartphone, tablet computer, personal computer, roadside unit, or some other processor-based computing device that includes a communication unit 145. In some embodiments, the endpoint 124 is a DSRC-equipped device that is operable to send and receive DSRC messages.

DSRC is increasingly being included in vehicles because it is a source of sensor data which is required for many ADAS systems or autonomous driving system to provide their functionality. In the United States, seven different channels are dedicated to DSRC, with one of these seven channels generally used for transmission of BSMs. For example, the channel is used about 99% of the time for BSM transmissions, and so, for the purposes of this description, this channel is referred to as "the channel dedicated to BSMs" or "the channel reserved for BSMs." The channel dedicated to BSMs (i.e., channel 172) receives a lot of use because each DSRC-enabled vehicle on the roadway transmits BSMs at regular intervals (e.g., one every 0.10 seconds). Another of these seven channels may be generally used for PSMs in a manner similar to how channel 172 is generally used for BSMs, and so, this channel is referred to as being "dedicated to PSMs" or "reserved for PSMs." For example, it is thought that channel 176 may be generally used for PSMs.

In some embodiments, the vehicle 123 is equipped with two or more different DSRC radios (e.g., the first V2X radio 147 and the second V2X radio 148). Each of the DSRC radios includes a DSRC transmitter and a DSRC receiver. One of the DSRC radios is dedicated solely to receiving BSMs. The other DSRC radio(s) is used to receive any other non-BSM DSRC messages.

Referring now to FIG. 1B, depicted is an operating environment 101 that includes a set of V2X radios 147, 148 and the interference reduction system 199 according to some embodiments.

As depicted in FIG. 1B, V2X channel #172 is the channel is reserved for BSMs. The first V2X radio 147 is dedicated to sending and receiving BSMs using V2X channel #172. The other six V2X channels (#174, #176, #178, #180, #182 and #184) are accessible to the second V2X radio 148. As depicted in this embodiment, channel #176 is reserved for receiving PSMs.

As depicted in FIG. 1B, the memory 127 may store V2X message data 193, interference data 194, source data 195, performance data 196, feedback data 197 and any other data not shown in the figure. For example, in some embodiments the memory 127 stores one or more of the following: waveform data; and mask data.

In some embodiments, the V2X message data 193 describes a payload for a V2X message. For example, the V2X message data 193 describes the BSM data for a BSM. In some embodiments, the V2X message data 193 describes the payload for a DSRC message or any other type of V2X messages. In some embodiments, the V2X message data 193 describes different versions of a V2X message, e.g., a received version of the V2X message including payload data that is obscured by an interference signal, a modified version of the V2X message including the payload data which is substantially unobscured by the interference signal, and one or more intermediate versions of the V2X message with one or more types of interference being reduced. In some embodiments, the V2X message data is an example of waveform data or an element of the waveform data.

In some embodiments, the interference data 194 describes an interference signal present on a V2X message. For example, the interference data 194 includes: data describing a source of the interference signal (e.g., on-board the V2X radio, off-board the V2X radio, or on-board and off-board the V2X radio); data describing a type of the interference signal (e.g., self-interference, adjacent channel interference, or combination interference which is a combination of the self-interference and the adjacent channel interference); data describing a strength of the self-interference; and data describing a strength of the adjacent channel interference.

In some embodiments, the performance data 196 describes interference cancellation performance associated with a V2X message. For example, the performance data 196 includes data describing a signal-to-interference-plus-noise ratio (SINR) of a V2X message after the interference reduction system 199 applies a cancellation sequence to cancel out any interference in the V2X message. For example, a higher SINR of the V2X message may indicate a better performance of the interference reduction system 199.

In some embodiments, the feedback data 197 describes feedback, suggestions, strategies, etc., which are used for updating or improving performance of the cancellation sequence. For example, the feedback data 197 includes data describing a processing speed and a successful rate of the cancellation sequence when being applied to cancel out interference from V2X messages (e.g., how quickly and how successfully the cancellation sequence is applied). In another example, the feedback data 197 includes data describing different execution orders in the cancellation sequence and performance of the cancellation sequence corresponding to the different execution orders. The execution orders in the cancellation sequence are described below with reference to FIG. 7.

Example Computer System

Figure 2:
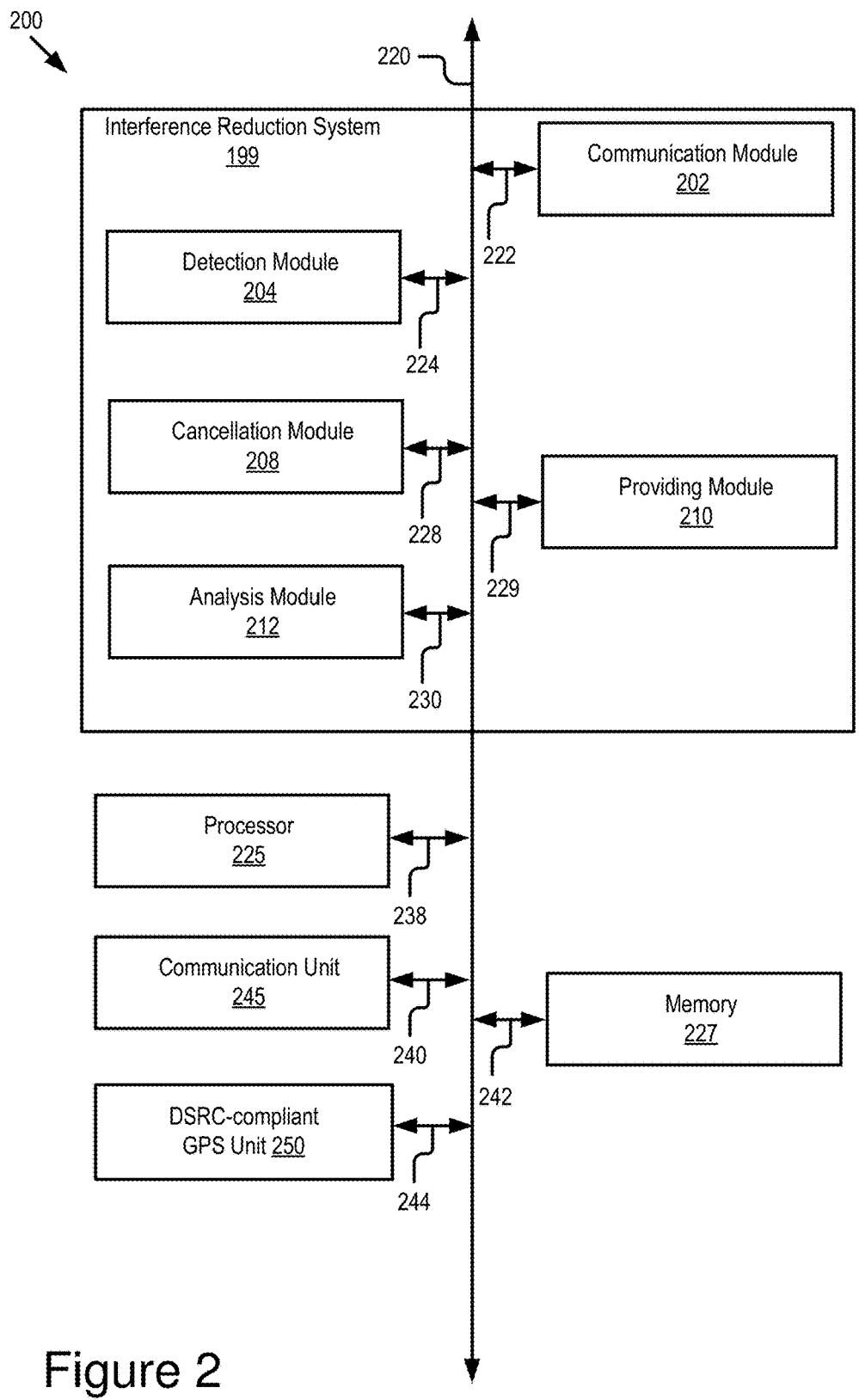
FIG. 2 is a block diagram illustrating an example computer system including an interference reduction system according to some embodiments.

Referring now to FIG. 2, depicted is a block diagram illustrating an example computer system 200 including the interference reduction system 199 according to some embodiments. In some embodiments, the computer system 200 may include a special-purpose computer system that is programmed to perform one or more steps of the methods 300 and 400 described below with reference to FIGS. 3-7. In some embodiments, the computer system 200 is an on-board vehicle computer of the vehicle 123. In some embodiments, the computer system 200 is an on-board unit of the vehicle 123. In some embodiments, the computer system 200 is an electronic control unit (ECU), head unit or some other processor-based computing device of the vehicle 123.

The computer system 200 includes one or more of the following elements according to some examples: the interference reduction system 199; a processor 225; a communication unit 245; a memory 227; and a DSRC-compliant GPS unit 250. The components of the computer system 200 are communicatively coupled by a bus 220.

In the illustrated embodiment, the processor 225 is communicatively coupled to the bus 220 via a signal line 238. The communication unit 245 is communicatively coupled to the bus 220 via a signal line 240. The memory 127 is communicatively coupled to the bus 220 via a signal line 242. The DSRC-compliant GPS unit 250 is communicatively coupled to the bus 220 via a signal line 244.

The processor 225 provides similar functionality as the processor 125 described above with reference to FIG. 1A, and so, that description will not be repeated here. The communication unit 245 provides similar functionality as the communication unit 245 described above with reference to FIG. 1A, and so, that description will not be repeated here. The memory 227 provides similar functionality as the memory 127 described above with reference to FIG. 1A, and so, that description will not be repeated here.

The memory 227 may store any of the data described above with reference to FIGS. 1A, and 1B or below with reference to FIGS. 2-12. The memory 227 may store any data needed for the computer system 200 to provide its functionality.

In some embodiments, the DSRC-compliant GPS unit 250 includes any hardware and software necessary to make the vehicle 123, computer system 200, or the DSRC-compliant GPS unit 250 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 250 is operable to provide GPS data describing the location of the vehicle 123 with lane-level accuracy. For example, the vehicle 123 is traveling in a lane of a roadway. Lane-level accuracy means that the location of the vehicle 123 is described by the GPS data so accurately that the lane of travel of the vehicle 123 within the roadway may be accurately determined based on the GPS data for this vehicle 123 as provided by the DSRC-compliant GPS unit 250. In some embodiments, the GPS data is an element of the BSM data or the PSM data.

In some embodiments, the DSRC-compliant GPS unit 250 includes hardware that wirelessly communicates with a GPS satellite to retrieve GPS data that describes the geographic location of the vehicle 123 with a precision that is compliant with the DSRC standard. The DSRC standard requires that GPS data be precise enough to infer if two vehicles (one of which is, for example, the vehicle 123) are located in adjacent lanes of travel. In some embodiments, the DSRC-compliant GPS unit 250 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the interference reduction system 199 described herein may analyze the GPS data provided by the DSRC-compliant GPS unit 250 and determine what lane the vehicle 123 is traveling in based on the relative positions of two or more different vehicles (one of which is, for example, the vehicle 123) traveling on the roadway at the same time.

By comparison to the DSRC-compliant GPS unit 250, a conventional GPS unit which is not compliant with the DSRC standard is unable to determine the location of a vehicle 123 with lane-level accuracy. For example, a typical roadway lane is approximately 3 meters wide. However, a conventional GPS unit only has an accuracy of plus or minus 10 meters relative to the actual location of the vehicle 123. As a result, such conventional GPS units are not sufficiently accurate to identify a lane of travel for a vehicle 123 based on GPS data alone; instead, systems having only conventional GPS units must utilize sensors such as cameras to identify the lane of travel of the vehicle 123. Identifying a lane of travel of a vehicle is beneficial, for example, because in some embodiments it may enable the interference reduction system 199 to more accurately identify a location of a vehicle 123 including the computer system 200 and traveling in a roadway having multiple lanes of travel.

In the illustrated embodiment shown in FIG. 2, the interference reduction system 199 includes: a communication module 202; a detection module 204; a cancellation module 208; a providing module 210; and an analysis module 212.

The communication module 202 can be software including routines for handling communications between the interference reduction system 199 and other components of the operating environments 100 and 101 of FIGS. 1A and 1B, respectively.

In some embodiments, the communication module 202 can be a set of instructions executable by the processor 225 to provide the functionality described below for handling communications between the interference reduction system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 127. The communication module 202 may send or receive any of the digital data or messages described above with reference to FIGS. 1A and 1B, or below with reference to FIGS. 2-15, via the communication unit 245.

In some embodiments, the communication module 202 receives data from components of the interference reduction system 199 and stores the data in the memory 227 (or a buffer or cache of the memory 227, or a standalone buffer or cache which is not depicted in FIG. 2). For example, the communication module 202 receives the V2X message data from the communication unit 245 and stores the V2X message data in the memory 227.

In some embodiments, the communication module 202 may handle communications between components of the interference reduction system 199. For example, the communication module 202 transmits the source data 195 from the detection module 204 to the cancellation module 208.

In some embodiments, the detection module 204 can be a set of instructions executable by the processor 225 which are operable, when executed by the processor 225, to cause the processor 225 to detect a presence of an interference signal on a channel of a V2X radio and determine a source of the interference signal. In some embodiments, the detection module 204 can be stored in the memory 227 of the computer system 200 and can be accessible and executable by the processor 225. The detection module 204 may be adapted for cooperation and communication with the processor 225 and other components of the computer system 200 via signal line 224.

In some embodiments, an interference signal is present on a channel of a V2X radio when a V2X message is received via the channel of the V2X radio. The interference signal obscures payload data included in the V2X message. The interference signal includes adjacent channel interference, self-interference, or combination interference.

Adjacent channel interference is interference caused by simultaneous reception of V2X messages using adjacent channels of V2X radios on a receiving vehicle. When the receiving vehicle is far from a first transmitting vehicle which transmits using a first channel and is close to a second transmitting vehicle which transmits using a second channel, due to the near-far effect a signal received via the second channel from the second transmitting vehicle may cause severe adjacent channel interference on a signal received via the first channel from the first transmitting vehicle. The adjacent channel interference can severely degrade performance of V2X communications on the first channel of the receiving vehicle. Because this type of interference (adjacent channel interference) is originated from a signal transmitted from another vehicle, a source of the adjacent channel interference may be referred to as off-board the V2X radio.

For example, assume that two signals x and y are received simultaneously via two adjacent channels X and Y on a vehicle, with the x signal received on the X channel having a signal strength greater than that of the y signal received on the Y channel. In this situation, due to imperfect receiver filters, the x signal having a greater signal strength cannot be completely filtered out on a passband of the Y channel and bleeds into the y signal received on the Y channel (e.g., the x signal leaks into the passband of the y signal). As a result, the y signal is not clearly or accurately heard (or is completely missed) on the Y channel. That is, the reception of the x signal on the X channel causes adjacent channel interference on the reception of the y signal on the Y channel. The adjacent channel interference can be difficult to cancel out because it requires an estimation about what the x signal is so that parts of the y signal are not accidentally cancelled out while removing interference from the x signal. Cancellation of the adjacent channel interference is described below in more detail.

Self-interference is interference caused by simultaneous transmission and reception of V2X messages on a vehicle. For example, self-interference is interference caused by the vehicle's own V2X communications. Because this type of interference (self-interference) is originated from a signal transmitted by the vehicle itself, a source of the self-interference may be referred to as on-board the V2X radio.

For example, assume that a vehicle transmits an x signal on an X channel of a multi-channel V2X radio and simultaneously receives a y signal on a Y channel of the multi-channel V2X radio, where the x signal has a stronger signal strength than the y signal. In this situation, the transmission of the x signal on the X channel causes self-interference for the weaker y signal that is received on the Y channel. For example, the stronger x signal that is transmitted on the X channel creates noise on the Y channel such that the y signal is not clearly or accurately heard (or is completely missed). Compared with the adjacent channel interference, the self-interference is easier to cancel out because the interference reduction system 199 can read the x signal being transmitted on the X channel and use this information to cancel out any of the x signal that is heard on the Y channel. Cancellation of the self-interference is described below in more detail.

In some embodiments, a multi-channel V2X radio includes various channels that can operate at the same time, so that in practice any particular V2X channel may experience a combination of both adjacent channel interference and self-interference. Combination interference is used herein to refer to this type of interference which is a combination of the adjacent channel interference and the self-interference. Because this type of interference (combination interference) is originated from a signal transmitted from another vehicle as well as another signal transmitted by the vehicle itself, a source of the combination interference may be referred to as on-board and off-board the V2X radio.

In some embodiments, the detection module 204 monitors or listens to various channels of the V2X radio. The V2X radio receives or transmits V2X messages across various channels simultaneously. For each of the various channels, the detection module 204 is operable to detect whether an interference signal is present on the particular channel of the V2X radio. The interference signal may obscure payload data that is included in a V2X message received via the channel. In some embodiments, the detection module 204 is also operable to determine a source of the interference signal present on the channel. The source of the interference signal may be one of on-board the V2X radio (for the self-interference), off-board the V2X radio (for the adjacent channel interference), and on-board and off-board the V2X radio (for the combination interference).

For example, the detection module 204 measures a waveform that describes energy levels across multiple channels of the V2X radio (e.g., a waveform of received power across multiple channels) over a period of time, and determines respective signal strengths (e.g., respective received power) for the multiple channels. Assume that a particular channel of the V2X radio is used to receive a V2X message on the vehicle. Besides the particular channel for receiving the V2X message, if there are other channels having signal strengths greater than a threshold (which indicates that the other channels are used for transmitting messages or receiving messages at the same time when the V2X message is received), then the detection module 204 detects a presence of an interference signal on the particular channel, where the interference signal obscures payload data of the V2X message received on the particular channel. It is understood that the detection module 204 has knowledge of which channels are used to transmit messages by the vehicle itself. If all the other channels having signal strengths greater than the threshold are channels used for transmitting messages by the vehicle itself, then the detection module 204 determines that a source of the interference signal is on-board the V2X radio and the type of the interference signal is self-interference (e.g., see FIGS. 9A-9C as an example). If all the other channels having signal strengths greater than the threshold are channels used for receiving messages on the vehicle, then the detection module 204 determines that a source of the interference signal is off-board the V2X radio and the type of the interference signal is adjacent channel interference (e.g., see FIGS. 8A-8C as an example). If a first part of the other channels includes channels used for receiving messages on the vehicle and a second part of the other channels includes channels for transmitting messages by the vehicle itself, then the detection module 204 determines that a source of the interference signal is on-board and off-board the V2X radio and the type of the interference signal is combination interference (e.g., see FIGS. 10A-10D as an example).

In some embodiments, the cancellation module 208 can be a set of instructions executable by the processor 225 which are operable, when executed by the processor 225, to cause the processor 225 to cancel out the interference signal from the V2X message using a cancellation sequence selected based on the source and to generate a modified version of the V2X message including the payload data which is substantially unobscured by the interference signal. In some embodiments, the cancellation module 208 can be stored in the memory 227 of the computer system 200 and can be accessible and executable by the processor 225. The cancellation module 208 may be adapted for cooperation and communication with the processor 225 and other components of the computer system 200 via signal line 228.

In some embodiments, if the source of the interference signal is on-board the V2X radio (e.g., the interference signal is self-interference), the cancellation module 208 is operable to apply a self-interference cancellation technique to cancel out the self-interference from the V2X message and to generate a modified version of the V2X message including the payload data which is substantially unobscured by the self-interference. Details for the self-interference cancellation technique can be referred to in FIG. 5 as described below.

In some embodiments, if the source of the interference is off-board the V2X radio (e.g., the interference signal is adjacent channel interference), the cancellation module 208 is operable to apply an adjacent-channel-interference cancellation technique to cancel out the adjacent channel interference from the V2X message and to generate a modified version of the V2X message including the payload data which is substantially unobscured by the adjacent channel interference. Details for the adjacent-channel-interference cancellation technique can be referred to in FIGS. 6A-6B as described below.

In some embodiments, if the source of the interference is on-board and off-board the V2X radio (e.g., the interference signal is combination interference), the cancellation module 208 is operable to apply a cancellation sequence to cancel out the combination interference from the V2X message and to generate a modified version of the V2X message including the payload data which is substantially unobscured by the combination interference. For example, the cancellation sequence includes a combination of applying a self-interference cancellation technique and an adjacent-channel-interference cancellation technique to cancel out any self-interference and any adjacent channel interference from the V2X message respectively. Details for the cancellation sequence can be referred to in FIG. 7 as described below.

In some embodiments, the providing module 210 can be a set of instructions executable by the processor 225 which are operable, when executed by the processor 225, to cause the processor 225 to provide the modified version of the V2X message. In some embodiments, the providing module 210 can be stored in the memory 227 of the computer system 200 and can be accessible and executable by the processor 225. The providing module 210 may be adapted for cooperation and communication with the processor 225 and other components of the computer system 200 via signal line 229.

In some embodiments, the providing module 210 is operable to provide the modified version of the V2X message to a vehicle component so that the vehicle component provides its functionality based on the payload data and not the interference signal. The vehicle component can be any component in the vehicle, e.g., an ECU, an on-board ADAS or any other component.

In some embodiments, the analysis module 212 can be a set of instructions executable by the processor 225 which are operable, when executed by the processor 225, to cause the processor 225 to analyze interference cancellation performance associated with the V2X message. In some embodiments, the analysis module 212 can be stored in the memory 227 of the computer system 200 and can be accessible and executable by the processor 225. The analysis module 212 may be adapted for cooperation and communication with the processor 225 and other components of the computer system 200 via signal line 230.

In some embodiments, the analysis module 212 is operable to analyze interference cancellation performance associated with the V2X message and generate an analysis result correspondingly. For example, the analysis module 212 may analyze performance of the self-interference cancellation technique when it is applied to reduce self-interference from a received V2X message and may generate a signal-to-interference-plus-noise ratio (SINR) of the V2X message correspondingly, where the SINR can serve as an indicator indicating how effective the self-interference cancellation technique reduces the self-interference.

In another example, the analysis module 212 may analyze performance of the adjacent-channel-interference cancellation technique when it is applied to reduce the adjacent channel interference from the received V2X message and may generate a SINR of the V2X message correspondingly, where the SINR can serve as an indicator indicating how effective the adjacent-channel-interference cancellation technique reduces the adjacent channel interference. In yet another example, the analysis module 212 may analyze performance of the cancellation sequence when it is applied to reduce the combination interference from the received V2X message and may generate a SINR of the V2X message correspondingly, where the SINR can serve as an indicator indicating how effective the cancellation sequence reduces the combination interference.

In some embodiments, the analysis module 212 is operable to provide feedback data based on the analysis result of the interference cancellation performance. For example, the analysis module 212 generates feedback data describing a processing speed and a successful rate of the self-interference cancellation technique, the adjacent-channel cancellation technique or the cancellation sequence when they are applied to cancel out the self-interference, the adjacent channel interference or the combination interference from V2X messages, respectively (e.g., how quickly and how successfully the self-interference cancellation technique, the adjacent-channel cancellation technique and the cancellation sequence are applied). In another example, the analysis module 212 generates feedback data describing different execution orders in the cancellation sequence and different performance results of the cancellation sequence corresponding to the different execution orders.

In some embodiments, the analysis module 212 is operable to update the self-interference cancellation technique, the adjacent-channel cancellation technique and the cancellation sequence respectively based on the feedback data. For example, based on the feedback data describing different performance results of the cancellation sequence corresponding to the different execution orders, the analysis module 212 determines an optimal execution order in the cancellation sequence, and updates the execution order in the cancellation sequence to be the optimal execution order for future use.

Example Processes

Figure 3:
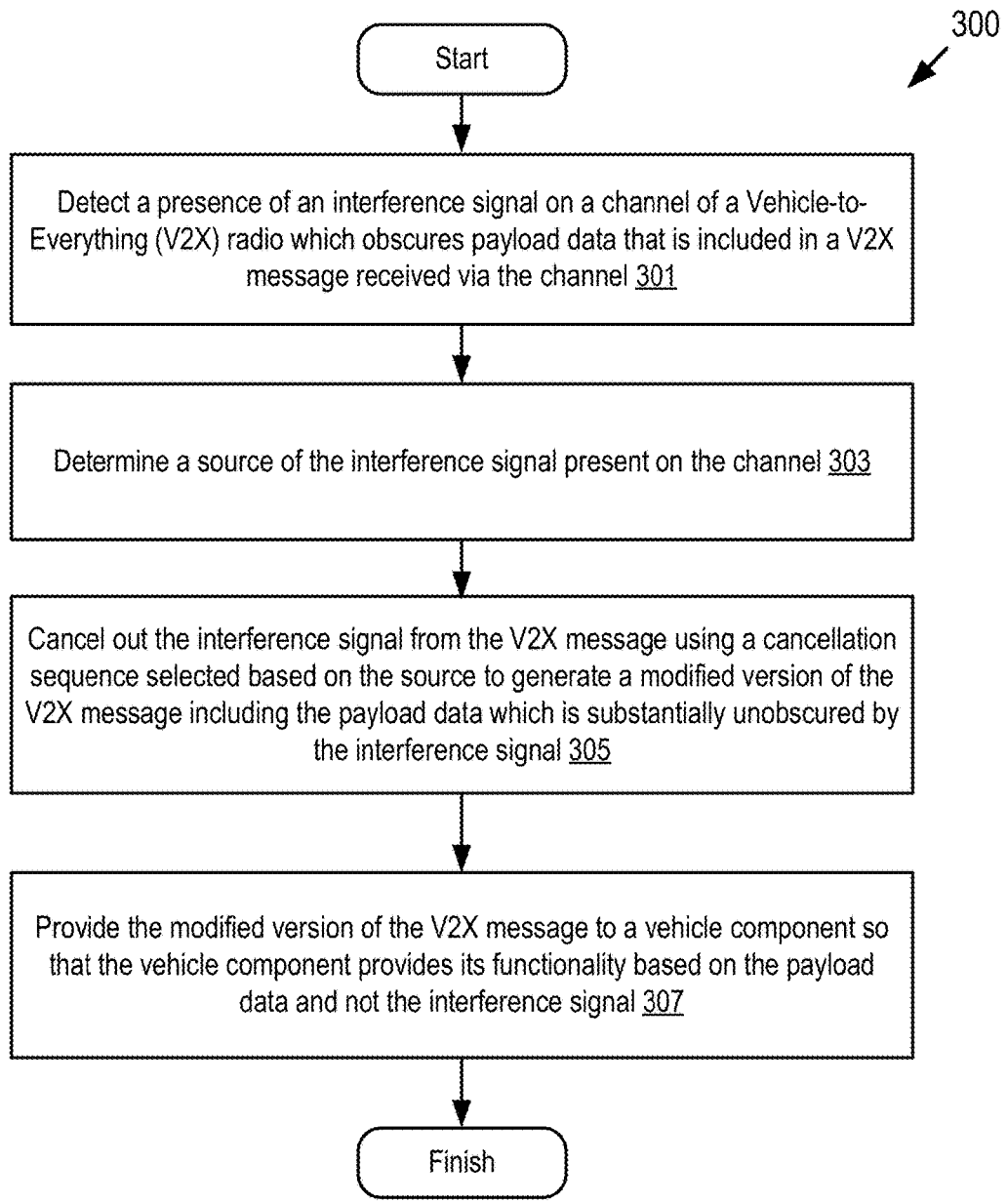
FIG. 3 depicts a method for reducing interference for a connected vehicle according to some embodiments.

FIG. 3 depicts a method 300 for cancelling out an interference signal from a V2X message for a connected vehicle according to some embodiments. The steps of the method 300 are executable in any order, and not necessarily the order depicted in FIG. 3. The method 300 can be applied for each channel of a multi-channel V2X radio.

At step 301, the detection module 204 monitors each channel of a V2X radio and detects a presence of an interference signal on a channel of the V2X radio, where the interference signal obscures payload data that is included in a V2X message received via the channel. An example of the V2X radio is a DSRC radio.

At step 303, the detection module 204 determines a source of the interference signal present on the channel. The source of the interference signal is one of on-board the V2X radio (e.g., a type of the interference signal is self-interference), off-board the V2X radio (e.g., a type of the interference signal is adjacent channel interference), and on-board and off-board the V2X radio (e.g., a type of the interference signal is combination interference).

At step 305, the cancellation module 208 cancels out the interference signal from the V2X message using a cancellation sequence selected based on the source to generate a modified version of the V2X message including the payload data which is substantially unobscured by the interference signal.

At step 307, the providing module 210 provides the modified version of the V2X message to a vehicle component so that the vehicle component provides its functionality based on the payload data and not the interference signal.

Figure 4A:
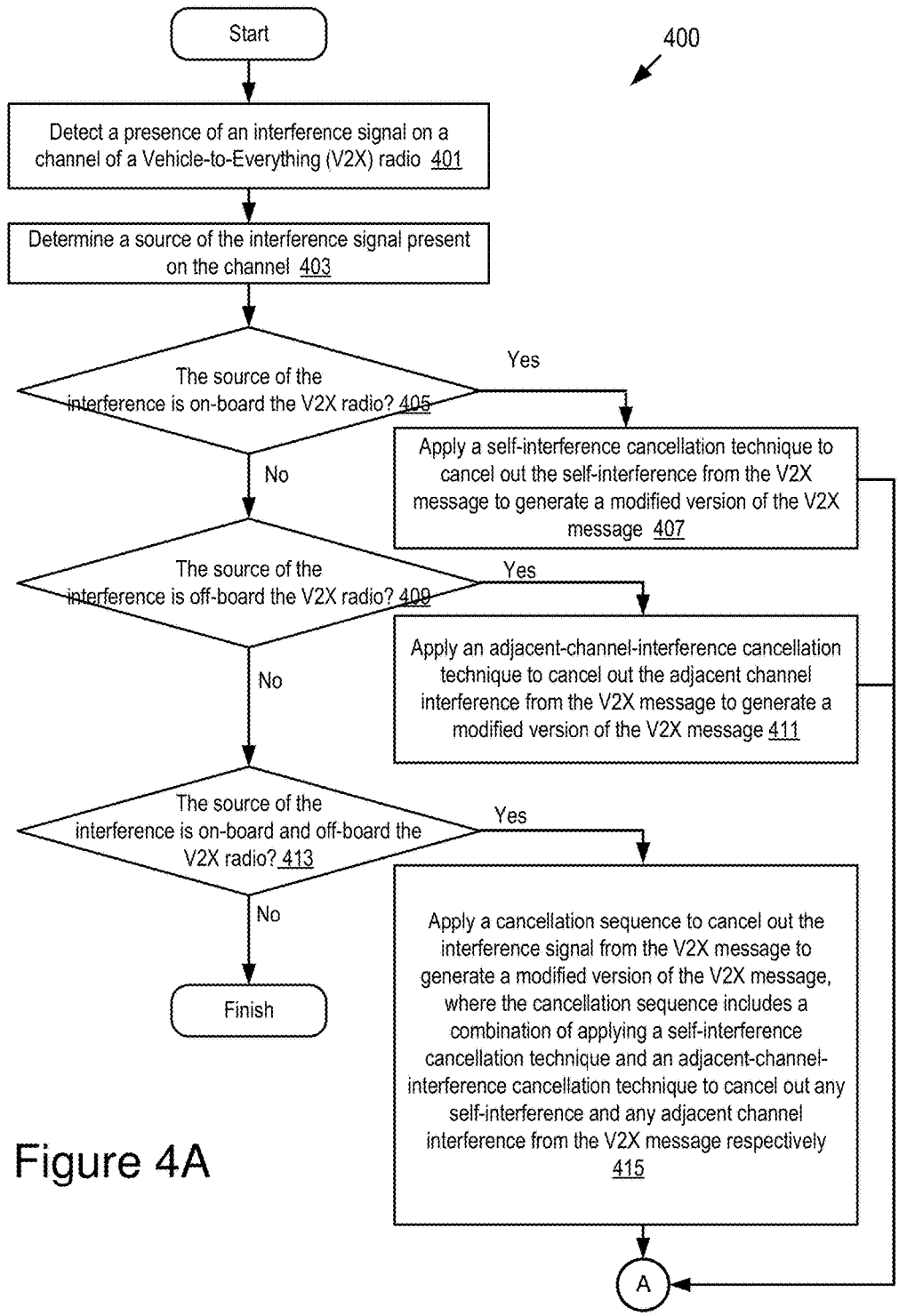
FIGS. 4A and 4B depict another method for reducing interference for a connected vehicle according to some embodiments.
Figure 4B:
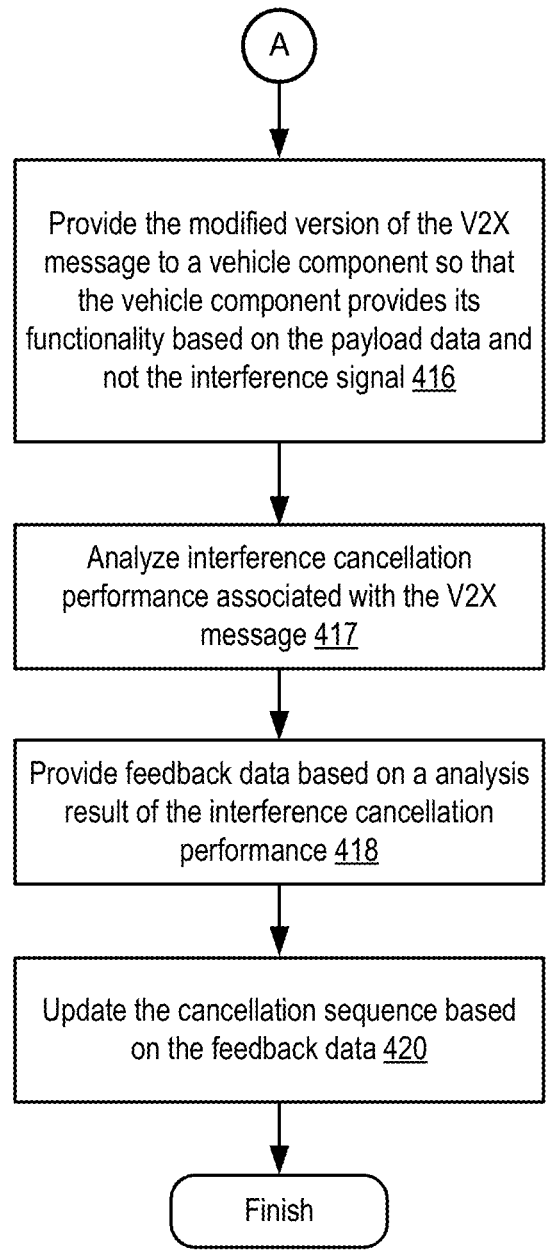

FIGS. 4A-4B depict another method 400 for cancelling out an interference signal from a V2X message for a connected vehicle according to some embodiments. The steps of the method 400 are executable in any order, and not necessarily the order depicted in FIGS. 4A-4B. The method 400 can be applied for each channel of a multi-channel V2X radio.

Referring to FIG. 4A, at step 401, the detection module 204 monitors each channel of a V2X radio and detects a presence of an interference signal on a channel of the V2X radio.

At step 403, the detection module 204 determines a source of the interference signal present on the channel.

At step 405, the cancellation module 208 determines whether the source of the interference signal is on-board the V2X radio. If the source of the interference signal is merely on-board the V2X radio, the type of the interference signal is self-interference and the method 400 proceeds to step 407; otherwise, the method 400 proceeds to step 409.

At step 407, the cancellation module 208 applies a self-interference cancellation technique to cancel out the self-interference from the V2X message to generate a modified version of the V2X message, and then the method 400 proceeds to step 416. Step 407 is described in more detail with reference to FIG. 5.

At step 409, the cancellation module 208 determines whether the source of the interference signal is off-board the V2X radio. If the source of the interference signal is merely off-board the V2X radio, the type of the interference signal is adjacent channel interference and the method 400 proceeds to step 411; otherwise, the method 400 proceeds to step 413.

At step 411, the cancellation module 208 applies an adjacent-channel-interference cancellation technique to cancel out the adjacent channel interference from the V2X message to generate a modified version of the V2X message, and then the method 400 proceeds to step 416. Step 411 is described in more detail with reference to FIGS. 6A-6B.

At step 413, the cancellation module 208 determines whether the source of the interference signal is on-board and off-board the V2X radio. If the source of the interference signal is on-board and off-board the V2X radio, the type of the interference signal is combination interference and the method 400 proceeds to step 415; otherwise, the method 400 ends.

At step 415, the cancellation module 208 applies a cancellation sequence to cancel out the interference signal from the V2X message to generate a modified version of the V2X message. For example, the cancellation sequence includes a combination of applying a self-interference cancellation technique and an adjacent-channel-interference cancellation technique to cancel out any self-interference and any adjacent channel interference from the V2X message respectively, and then the method 400 proceeds to step 416. Step 415 is described in more detail with reference to FIG. 7.

With reference to FIG. 4B, at step 416, the providing module 210 provides the modified version of the V2X message to a vehicle component so that the vehicle component provides its functionality based on the payload data and not the interference signal.

At step 417, the analysis module 212 analyzes interference cancellation performance associated with the V2X message. For example, the analysis module 212 analyzes performance of the self-interference cancellation technique, the adjacent-channel-interference cancellation technique, or the cancellation sequence when the self-interference cancellation technique, the adjacent-channel-interference cancellation technique or the cancellation sequence is applied to cancel out the interference signal from the V2X message.

At step 418, the analysis module 212 provides feedback data based on an analysis result of the interference cancellation performance.

At step 420, the analysis module 212 updates the self-interference cancellation technique, the adjacent-channel-interference cancellation technique or the cancellation sequence based on the feedback data.

Figure 5:
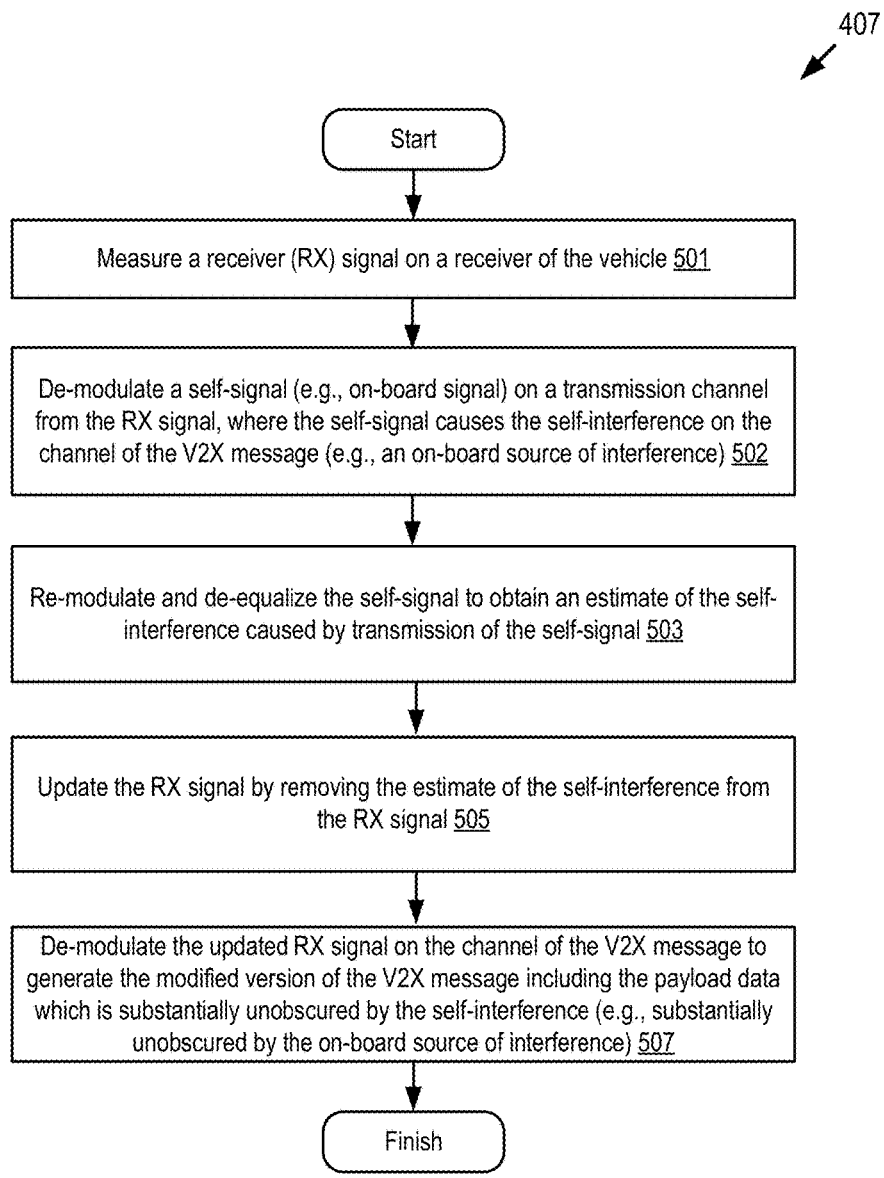
FIG. 5 depicts a method for applying a self-interference cancellation technique to reduce self-interference from a V2X message according to some embodiments.

FIG. 5 depicts a method for applying a self-interference cancellation technique to reduce self-interference from a V2X message received on a vehicle according to some embodiments. The steps of the method are executable in any order, and not necessarily the order depicted in FIG. 5.

At step 501, the cancellation module 208 measures a received signal on a receiver of the vehicle in multiple channels. For example, the received signal can be referred to as a RX signal, e.g., the RX signal including a mixture of a self-signal transmitted by the vehicle itself via a transmission channel and the V2X message received on the vehicle via a channel different from the transmission channel. The self-signal is transmitted from the vehicle to another vehicle at the same time when the V2X message is received on the vehicle. The transmission of the self-signal causes self-interference on the channel of the V2X message.

At step 502, the cancellation module 208 de-modulates the self-signal on a transmission channel from the RX signal. In some embodiments, the vehicle itself has knowledge of which protocol is used to transmit the self-signal (referred to as "transmission protocol"), and the cancellation module 208 de-modulates the self-signal using the known transmission protocol from the RX signal measured on the receiver of the vehicle.

In some embodiments, the vehicle itself has knowledge of a modulated version of the self-signal (e.g., a passband version of the self-signal) that feeds to an antenna for transmission. In this case, the cancellation module 208 uses the known transmission protocol to de-modulate the self-signal from the modulated version of the self-signal rather than from the RX signal. In some embodiments, the vehicle itself has knowledge of a baseband version of the self-signal. Thus, the cancellation module 208 does not need to perform the de-modulation operation at step 502 to obtain the self-signal at the baseband and the method moves to step 503 directly.

At step 503, the cancellation module 208 re-modulates the self-signal obtained above and de-equalizes the re-modulated self-signal to obtain an estimate of the self-interference caused by transmission of the self-signal. For example, the cancellation module 208 re-modulates the self-signal using the known transmission protocol, and then de-equalizes the re-modulated self-signal to obtain an estimate of the self-interference which is caused on the channel of the V2X message by transmission of the self-signal.

At step 505, the cancellation module 208 updates the RX signal by removing the estimate of the self-interference from the RX signal. For example, the cancellation module 208 subtracts the estimate of the self-interference from the RX signal to obtain an updated RX signal. The updated RX signal is a version of the V2X message with the self-interference being reduced or subtracted.

At step 507, the cancellation module 208 de-modulates the updated RX signal on the channel of the V2X message, so as to generate the modified version of the V2X message including the payload data which is substantially unobscured by the self-interference.

Figure 9A:
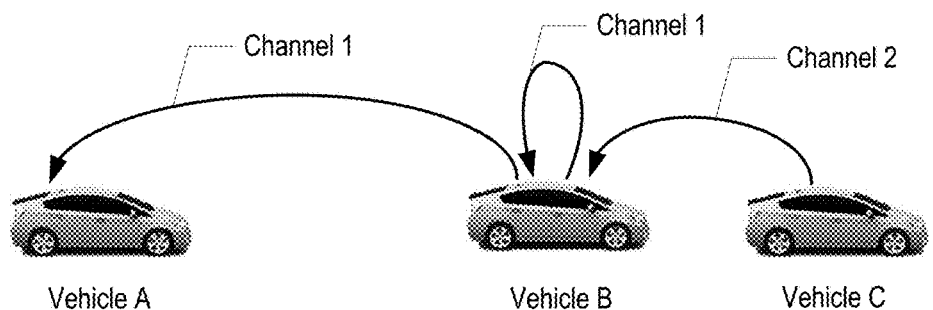
FIGS. 9A-9C are graphical representations illustrating an example of self-interference cancellation according to some embodiments.

An example of applying the self-interference cancellation technique to reduce self-interference from a V2X message received on a vehicle is illustrated with reference to FIGS. 9A-9C. Turning to FIG. 9A, a vehicle B transmits a first signal which carries information of a first V2X message to a vehicle A via a first channel (Channel 1), and simultaneously the vehicle B receives a second signal which carries information of a second V2X message from a vehicle C via a second channel (Channel 2). The first signal may be referred to as the vehicle B's self-signal, and the second signal may be referred to as the vehicle C's signal. The vehicle B's self-signal and the vehicle C's signal can be signals using different V2X solutions (e.g., 802.11p-DSRC, LTE/5G-V2X, etc.) or unlicensed band communication solutions (e.g., WiFi, LTE-U, LTE-LAA, etc.).

Figure 9B:
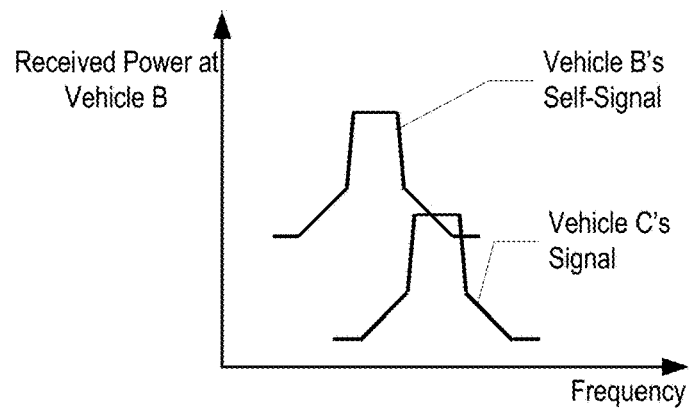

With reference to FIG. 9B, a RX signal on a receiver of the vehicle B can be measured (e.g., the measured RX signal may include the transmitted self-signal and the vehicle C's signal). For example, a waveform of received power of the RX signal at the receiver of the vehicle B can be measured. The vehicle B's self-signal has a signal strength stronger than that of the vehicle C's signal, and transmission of the vehicle B's self-signal creates self-interference from Channel 1 to Channel 2. For example, when the vehicle B transmits the self-signal, it makes simultaneous reception of the vehicle C's signal via Channel 2 difficult due to the intense self-interference.

Figure 9C:
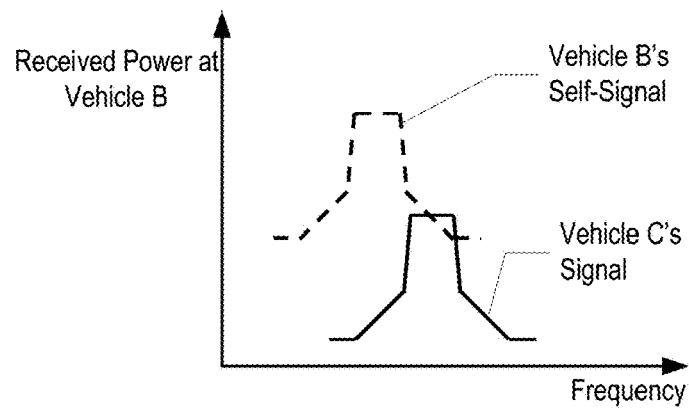

With reference to FIG. 9C, the self-interference created by transmission of the vehicle B's self-signal can be reduced by applying the self-interference cancellation technique. For example, at the vehicle B, the interference reduction system 199 has knowledge of a transmission protocol that is used to transmit the self-signal by the vehicle B itself, and de-modulates the self-signal using the transmission protocol from the RX signal measured on the receiver of the vehicle B. Then, the interference reduction system 199 re-modulates the self-signal and de-equalizes the re-modulated self-signal to obtain an estimate of the self-interference on Channel 2 of the second V2X message caused by the transmission of the self-signal via Channel 1.

Next, the interference reduction system 199 subtracts the estimate of the self-interference from the RX signal to obtain an updated RX signal. The updated RX signal includes information of the second V2X message with the self-interference being subtracted. For example, with reference to FIG. 9C, a sub-waveform of received power of the vehicle B's self-signal is subtracted from the waveform of received power at the receiver of the vehicle B. Another sub-waveform which represents received power of the vehicle C's signal remains, which also represents a waveform of the updated RX signal with the self-interference being subtracted. The interference reduction system 199 de-modulates the updated RX signal on Channel 2 of the second V2X message, so as to generate the modified version of the second V2X message including payload data which is substantially unobscured by the self-interference from the vehicle B's self-signal.

FIGS. 6A and 6B depicts a method for applying an adjacent-channel-interference cancellation technique to reduce adjacent channel interference from a V2X message according to some embodiments. The steps of the method are executable in any order, and not necessarily the order depicted in FIGS. 6A-6B.

At step 601, the cancellation module 208 measures a received signal (e.g., a RX signal) on a receiver of the vehicle in multiple channels. For example, the RX signal includes a mixture of a V2X message received on the vehicle via a first channel and one or more other messages received via one or more adjacent channels. The one or more other messages are transmitted from one or more other vehicles to the vehicle at the same time when the V2X message is received on the vehicle. The simultaneous reception of the one more other messages on the receiver causes adjacent channel interference on the first channel of the V2X message.

At step 603, the cancellation module 208 selects an adjacent channel from the one or more adjacent channels for decoding, so that adjacent channel interference associated with the selected adjacent channel is to be reduced from the V2X message. In some embodiments, the cancellation module 208 selects an adjacent channel for decoding based on a channel selection rule. For example, the channel selection rule may indicate that: initially an adjacent channel that has a maximal signal strength among the multiple channels is selected; afterwards, if there are additional adjacent channels remaining to be processed, an adjacent channel that has a strongest signal strength among the remaining adjacent channels is selected for each remaining iteration. That is, an adjacent channel with a maximal signal strength among a pool of channels that remain to be processed is selected in each iteration.

In other examples, the cancellation module 208 selects an adjacent channel for decoding based on other different channel selection rules, so that performance of the adjacent-channel-interference cancellation technique can be determined for the different channel selection rules. In some embodiments, different channel selection rules may select adjacent channels with different orders. The analysis module 212 can analyze the performance of the adjacent-channel-interference cancellation technique for different channel selection rules, so that an optimal channel selection rule can be determined for the adjacent-channel-interference cancellation technique and can be used to update the adjacent-channel-interference cancellation technique.

For the selected adjacent channel, a message received at this adjacent channel can be modulated using one of multiple protocols (e.g., a first protocol to an Nth protocol). Because the receiver has no knowledge of which protocol is used before decoding, the cancellation module 208 at the receiver can try out all the available protocols for decoding and then determine a correct protocol based on the decoding results. Specifically, at step 605, the cancellation module 208 decodes the RX signal using a first protocol and obtains a first decoding result and a first decoding signal. At step 607, the cancellation module 208 decodes the RX signal using a second protocol and obtains a second decoding result and a second decoding signal. Similarly, the cancellation module 208 decodes the RX signal using other protocols and obtains corresponding decoding results and decoding signals, respectively. At step 609, the cancellation module 208 decodes the RX signal using an Nth protocol and obtains an Nth decoding result and an Nth decoding signal. Thus, the first to the Nth decoding results and the first to the Nth decoding signals are obtained, where N is a total number of the available protocols.

Each decoding result may indicate whether the decoding using the corresponding protocol is successful or not. For example, if the first protocol is actually used on the selected adjacent channel, then the first decoding result indicates that the decoding using the first protocol is successful (e.g., the first decoding result=1); however, if the first protocol is not used on the selected adjacent channel, then the first decoding result indicates that the decoding using the first protocol fails (e.g., the first decoding result=0).

At step 611, the cancellation module 208 identifies a protocol that is actually used in the adjacent channel from the first to the Nth protocols based on the first to the Nth decoding results, and identifies a decoding result corresponding to the identified protocol from the first to the Nth decoding signals. For example, the cancellation module 208 identifies a protocol whose decoding result is successful, and then identifies a decoding result corresponding to the identified protocol.

By execution of steps 605, 607, 609 and 611, the cancellation module 208 de-modulates the identified decoding signal on the adjacent channel from the RX signal using the identified protocol.

At step 615, the cancellation module 208 re-modulates the identified decoding signal using the identified protocol.

In some embodiments, an interference reduction system is installed in an ECU of a connected vehicle that includes a multiple channel V2X radio. The interference reduction system includes code and routines are stored on a non-transitory memory of the ECU. The code and routines are operable, when executed by the ECU, to cause the ECU to execute the following steps for each channel of the multiple channel V2X radio: (1) determine a type of interference being experienced; (2) if the type of interference at step 1 is adjacent channel interference, the interference reduction system estimates the adjacent-channel interference waveform which would be caused by V2X messages for neighboring channels and then cancels out this adjacent-channel interference waveform (or reduces it) for the neighboring channels so that V2X messages on these neighboring channels can be clearly heard by a V2X radio of the connected vehicle without the need to increase the energy level for these V2X messages; (3) if the type of interference at step 1 is self-interference, the interference reduction system knows the self-interference waveform [i.e., because the connected vehicle's own V2X radio is transmitting the V2X message(s) that is causing the self-interference] which would be caused by V2X messages for other channels and cancels out this self-interference waveform (or reduces it) for the other channels so that V2X messages on these other channels can be clearly heard by a V2X radio of the connected vehicle without the need to increase the energy level for these V2X messages; and (4) if the type of interference at step 1 is combination interference, then the interference reduction system applies a sequence of successive interference cancellation which is operable to cancel out the adjacent channel interference so that the V2X message for this particular V2X channel is clearly and accurately received without the need to increase the energy level for these messages. The sequence of successive interference cancellation techniques is a combination of steps 2 and 3 described above in this paragraph. Step 4 includes two sub-steps which are defined below in the next three paragraphs. These sub-steps include reference steps 2 and 4 described above in this paragraph.

The sequence of successive interference cancellation techniques is now defined, according to some embodiments, by reference to sub-steps for step 4 which is described in the preceding paragraph. The order in which these techniques is applied within the sequence is based on variables such as which interfering signal is stronger and whether the interfering signal is due to an on-board or an off-board source.

A first sub-step includes the following example features. In some embodiments, if the strongest interfering signal has an off-board source, then the sequence of successive interference cancellation techniques includes the interference reduction system applying step 2 and then step 3 to mitigate combination interference. The sequence of successive interference cancellation techniques may be updated based on the historical performance of the sequence based on both (1) how long it takes to cancel out the interfering signals and (2) how well the sequence has performed historically.

A second sub-step includes the following example features. In some embodiments, if the strongest interfering signal has an on-board source, then the sequence of successive interference cancellation techniques includes the interference reduction system applying step 3 and then step 2 to mitigate the combination interference. The sequence of successive interference cancellation techniques may be updated based on the historical performance of the sequence based on both (1) how long it takes to cancel out the interfering signals and (2) how well the sequence has performed historically.

In some embodiments, FIG. 6A is a first example of a sequence of successive interference cancellation techniques.

Referring to FIG. 6B, at step 617, the cancellation module 208 de-equalizes the re-modulated decoding signal using an estimate of the adjacent channel obtained during the decoding, so that an estimate of adjacent channel interference associated with the selected adjacent channel which is caused on the channel of the V2X message is obtained.

At step 619, the cancellation module 208 updates the RX signal by removing the estimate of the adjacent channel interference associated with the selected adjacent channel from the RX signal. For example, the cancellation module 208 updates the RX signal by subtracting the estimate of the adjacent channel interference associated with the selected adjacent channel from the RX signal. The updated RX signal is a version of the RX signal with the adjacent channel interference associated with the selected adjacent channel being reduced or subtracted.

At step 621, the cancellation module 208 determines whether interference from one or more additional adjacent channels is to be removed from the RX signal. If there is at least an additional adjacent channel to be processed, the method moves back to step 603, where the cancellation module 208 selects another adjacent channel for decoding based on the channel selection rule; otherwise, the method proceeds to step 623 (which means the adjacent channel interference associated with the adjacent channels is substantially reduced or eliminated).

At step 623, the cancellation module 208 de-modulates the updated RX signal on the channel of the V2X message, so as to generate the modified version of the V2X message including the payload data which is substantially unobscured by the adjacent channel interference caused by the adjacent channels.

Figure 8A:
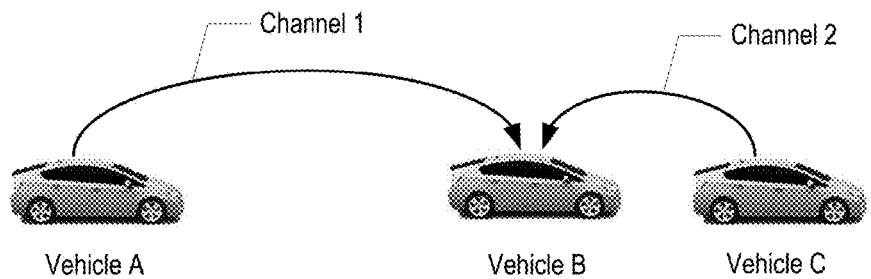
FIGS. 8A-8C are graphical representations illustrating an example of adjacent-channel-interference cancellation according to some embodiments.

An example of applying the adjacent-channel-interference cancellation technique to reduce adjacent channel interference from a V2X message received on a vehicle is illustrated with reference to FIGS. 8A-8C. Turning to FIG. 8A, a vehicle B receives a first signal which carries information of a first V2X message from a vehicle A via a first channel (Channel 1), and simultaneously the vehicle B receives a second signal which carries information of a second V2X message from a vehicle C via a second channel (Channel 2). The first signal may be referred to as the vehicle A's signal, and the second signal may be referred to as the vehicle C's signal. The vehicle A's signal and the vehicle C's signal can be signals using different V2X solutions or unlicensed band communication solutions.

Figure 8B:
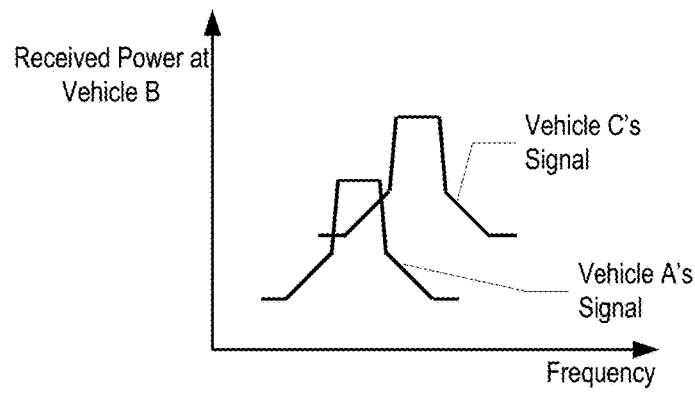
Figure 8C:
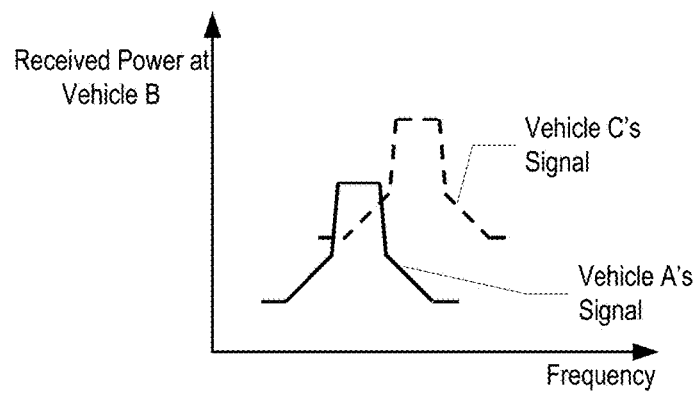

With reference to FIG. 8B, a RX signal on a receiver of the vehicle B can be measured (e.g., the RX signal may include the vehicle A's signal and the vehicle C's signal). For example, a waveform of received power of the RX signal at the receiver of the vehicle B can be measured. The vehicle C's signal has a signal strength stronger than that of the vehicle A's signal because the vehicle C is closer to the vehicle B than the vehicle A, and the reception of the vehicle C's signal creates adjacent channel interference from Channel 2 to Channel 1. That is, when the vehicle B receives the vehicle A's signal via Channel 1, the simultaneous reception of the vehicle C's signal via Channel 2 creates adjacent channel interference on Channel 1.

The adjacent channel interference created by the vehicle C's signal can be reduced by applying the adjacent-channel-interference cancellation technique. For example, at the vehicle B, the cancellation module 208 de-modulates the vehicle C's signal on Channel 2 from the RX signal by performing operations similar to those of steps 605, 607, 609 and 611 described in FIG. 6A. Then, the cancellation module 208 re-modulates the vehicle C's signal using an estimate of Channel 2, so that an estimate of adjacent channel interference associated with Channel 2 which is caused on Channel 1 is obtained.

Next, the cancellation module 208 updates the RX signal by removing the estimate of the adjacent channel interference associated with Channel 2 from the RX signal. For example, the cancellation module 208 updates the RX signal by subtracting the estimate of the adjacent channel interference associated with Channel 2 from the RX signal. The updated RX signal is a version of the RX signal with the adjacent channel interference associated with Channel 2 being reduced or subtracted. For example, with reference to FIG. 8C, a sub-waveform of received power of the vehicle C's signal is subtracted from the waveform of received power at the receiver of the vehicle B; and another sub-waveform which represents received power of the vehicle A's signal remains, which also represents a waveform of the updated RX signal.

Next, the cancellation module 208 de-modulates the updated RX signal on Channel 1, so as to generate the modified version of the first V2X message including payload data which is substantially unobscured by the adjacent channel interference from the vehicle C's signal.

In some embodiments, FIG. 6B is a second example of a sequence of successive interference cancellation techniques.

Figure 7:
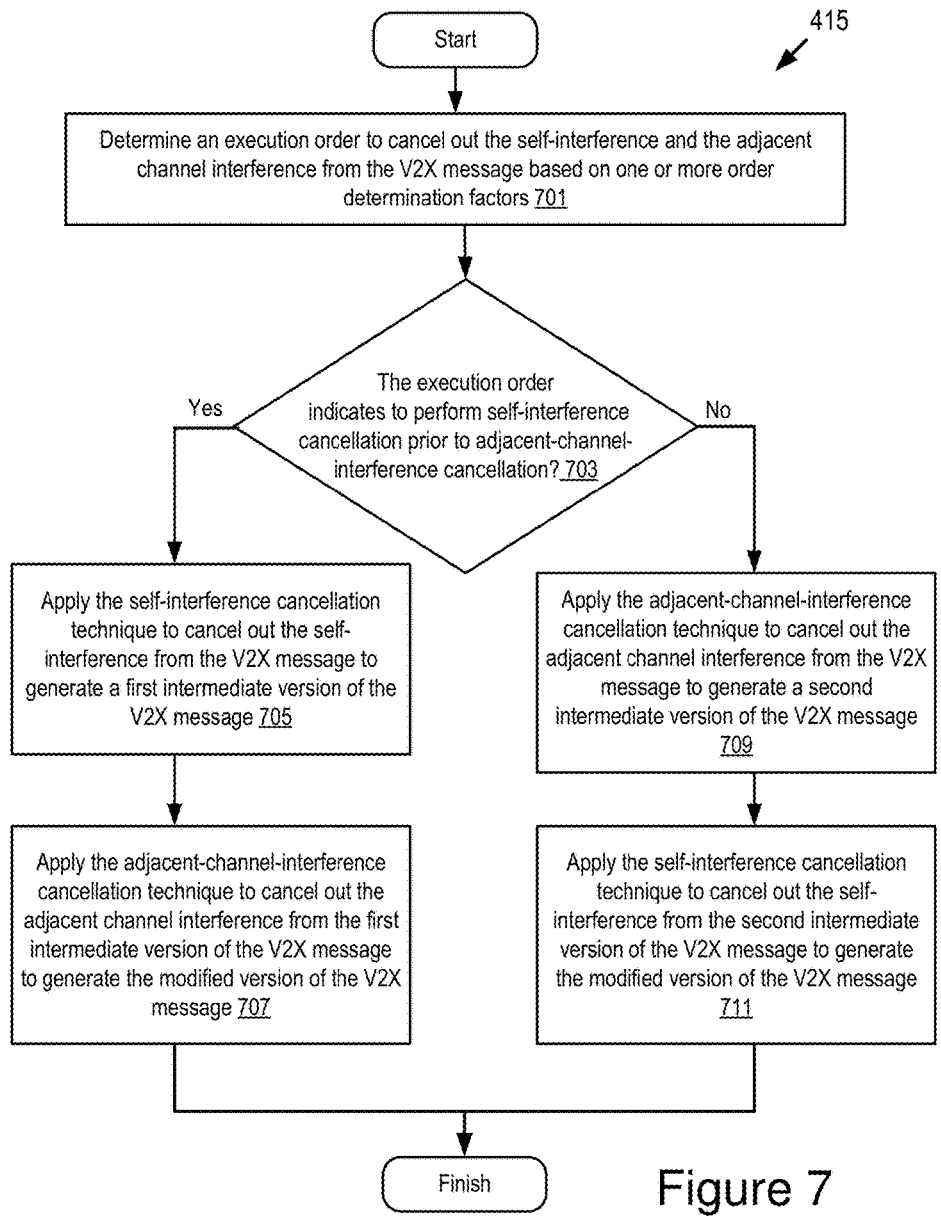
FIG. 7 depicts a method for applying a cancellation sequence to reduce combination interference from a V2X message according to some embodiments.

FIG. 7 depicts a method for applying a cancellation sequence to reduce combination interference from a V2X message according to some embodiments. The steps of the method are executable in any order, and not necessarily the order depicted in FIG. 7.

At step 701, the cancellation module 208 determines an execution order to cancel out both self-interference and adjacent channel interference from the V2X message based on one or more order determination factors. The combination interference includes self-interference and adjacent channel interference, and the one or more order determination factors include at least one of a strength of the self-interference, a strength of the adjacent channel interference, and a source of a maximal interference from the self-interference and the adjacent channel interference.

For example, if the maximal interference in the combination interference is the adjacent channel interference with a source being off-board the V2X radio (e.g., the adjacent channel interference has a strength greater than that of the self-interference), then the cancellation module 208 determines the execution order as performing adjacent-channel-interference cancellation prior to self-interference cancellation. However, if the maximal interference in the combination interference is the self-interference with a source being on-board the V2X radio (e.g., the adjacent channel interference has a strength smaller than that of the self-interference), then the cancellation module 208 determines the execution order as performing self-interference cancellation prior to adjacent-channel-interference cancellation.

In some embodiments, the execution order may be updated based on historical performance results of the cancellation sequence when using different execution orders. For example, an optimal execution order may be determined based on performance results including, e.g., how long it takes for each execution order to cancel out the combination interference and how well the cancellation sequence has performed historically for each execution order. In some embodiments, the cancellation sequence is updated based on the historical performance of the cancellation sequence based on both (1) how long it takes to cancel out the interfering signals and (2) how well the sequence has performed historically.

At step 703, the cancellation module 208 determines whether the execution order indicates to perform the self-interference cancellation prior to the adjacent-channel-interference cancellation (e.g., to cancel out the self-interference prior to the adjacent channel interference). If yes, then at step 705 the cancellation module 208 applies the self-interference cancellation technique to cancel out the self-interference from the V2X message to generate a first intermediate version of the V2X message, and at step 707 the cancellation module 208 applies the adjacent-channel-interference cancellation technique to cancel out the adjacent channel interference from the first intermediate version of the V2X message to generate the modified version of the V2X message.

In some embodiments, at step 705, the cancellation module 208 performs operations similar to those described above in FIG. 5. For example, assume that a self-signal is transmitted from the vehicle via a transmission channel, and simultaneously, a V2X message is received via a channel and another V2X message is received via an adjacent channel on the vehicle. The transmission of the self-signal causes self-interference and the reception of the other V2X message on the adjacent channel causes adjacent channel interference on the channel of the V2X message. The cancellation module 208 performs operations including but not limited to the following: (1) measuring a RX signal on a receiver of the vehicle in multiple channels (e.g., the RX signal includes a mixture of the self-signal transmitted by the vehicle itself via the transmission channel, the V2X message received on the vehicle via the channel, and the other V2X message received on the vehicle via the adjacent channel); (2) de-modulating the self-signal on the transmission channel from the RX signal; (3) re-modulating the self-signal obtained above and de-equalizing the re-modulated self-signal to obtain an estimate of the self-interference on the channel of the V2X message that is caused by the transmission of the self-signal; and (4) updating the RX signal by removing the estimate of the self-interference from the RX signal (e.g., the updated RX signal is the first intermediate version of the V2X message with the self-interference being reduced or subtracted), and moving to step 707 to continue cancellation of the adjacent channel interference.

Next, at step 707, the cancellation module 208 performs operations similar to those described above in FIGS. 6A-6B, where the RX signal is already updated at step 705 by removing the self-interference. For example, the cancellation module 208 performs operations including but not limited to the following: (1) selecting an adjacent channel from one or more adjacent channels for decoding, so that adjacent channel interference associated with the selected adjacent channel is to be reduced from the V2X message; (2) decoding the RX signal using a first to an Nth protocols and obtaining a first to an Nth decoding results and a first to an Nth decoding signals, respectively; (3) identifying a protocol that is actually used in the adjacent channel from the first to the Nth protocols based on the first to the Nth decoding results, and identifying a decoding result corresponding to the identified protocol from the first to the Nth decoding signals; (4) re-modulating the identified decoding signal using the identified protocol; (5) de-equalizing the re-modulated decoding signal using an estimate of the adjacent channel obtained during the decoding, so that an estimate of adjacent channel interference associated with the selected adjacent channel which is caused on the channel of the V2X message is obtained; (6) updating the RX signal by removing the estimate of the adjacent channel interference associated with the selected adjacent channel from the RX signal (e.g., the updated RX signal is a version of the RX signal with the adjacent channel interference associated with the selected adjacent channel as well as the self-interference being reduced or subtracted); (7) determining whether interference from one or more additional adjacent channels is to be removed from the RX signal; (8) if there is at least an additional adjacent channel to be processed, moving back to Operation (1) where the cancellation module 208 selects another adjacent channel for decoding based on the channel selection rule, and then repeating Operations (2)-(8) until there is no additional adjacent channel to be processed; and (9) if there is no additional adjacent channel to be processed, de-modulating the updated RX signal on the channel of the V2X message, so as to generate the modified version of the V2X message including the payload data which is substantially unobscured by the self-interference and any adjacent channel interference.

On the other hand, if the execution order indicates to perform the adjacent-channel-interference cancellation prior to the self-interference cancellation (e.g., to cancel out the adjacent channel interference prior to the self-interference), then at step 709 the cancellation module 208 applies the adjacent-channel-interference cancellation technique to cancel out the adjacent channel interference from the V2X message to generate a second intermediate version of the V2X message, and then at step 711 the cancellation module 208 applies the self-interference cancellation technique to cancel out the self-interference from the second intermediate version of the V2X message to generate the modified version of the V2X message.

In some embodiments, at step 709, the cancellation module 208 performs operations similar to those described above in FIGS. 6A-6B. For example, the cancellation module 208 performs operations including but not limited to the following: (1) measuring a RX signal on a receiver of the vehicle in multiple channels (e.g., the RX signal includes a mixture of a self-signal transmitted by the vehicle itself via a transmission channel, a V2X message received on the vehicle via a channel, and another V2X message received on the vehicle via an adjacent channel); (2) selecting an adjacent channel from one or more adjacent channels for decoding, so that adjacent channel interference associated with the selected adjacent channel is to be reduced from the V2X message; (3) decoding the RX signal using a first to an Nth protocols and obtaining a first to an Nth decoding results and a first to an Nth decoding signals, respectively; (4) identifying a protocol that is actually used in the adjacent channel from the first to the Nth protocols based on the first to the Nth decoding results, and identifying a decoding result corresponding to the identified protocol from the first to the Nth decoding signals; (5) re-modulating the identified decoding signal using the identified protocol; (6) de-equalizing the re-modulated decoding signal using an estimate of the adjacent channel obtained during the decoding, so that an estimate of adjacent channel interference associated with the selected adjacent channel which is caused on the channel of the V2X message is obtained; (7) updating the RX signal by removing the estimate of the adjacent channel interference associated with the selected adjacent channel from the RX signal (e.g., the updated RX signal is a version of the RX signal with the adjacent channel interference associated with the selected adjacent channel being reduced or subtracted); (7) determining whether interference from one or more additional adjacent channels is to be removed from the RX signal; (8) if there is at least an additional adjacent channel to be processed, moving back to Operation (1) where the cancellation module 208 selects another adjacent channel for decoding based on the channel selection rule, and then repeating Operations (2)-(8) until there is no additional adjacent channel to be processed; and (9) if there is no additional adjacent channel to be processed, moving to step 711 to continue cancellation of the self-interference (at this stage, the updated RX signal is the second intermediate version of the V2X signal with the adjacent channel interference being reduced or subtracted).

In some embodiments, at step 711 the cancellation module 208 performs operations similar to those described above in FIG. 5, where the RX signal is already updated at step 709 by reducing the adjacent channel interference. For example, the cancellation module 208 performs operations including but not limited to the following: (1) de-modulating the self-signal on the transmission channel from the RX signal which is updated at step 709; (3) re-modulating the self-signal obtained above and de-equalizing the re-modulated self-signal to obtain an estimate of the self-interference on the channel of the V2X message which is caused by the transmission of the self-signal; (4) updating the RX signal by removing the estimate of the self-interference from the RX signal; and (5) de-modulating the updated RX signal on the channel of the V2X message, so as to generate the modified version of the V2X message including the payload data which is substantially unobscured by the self-interference and any adjacent channel interference.

Figure 10A:
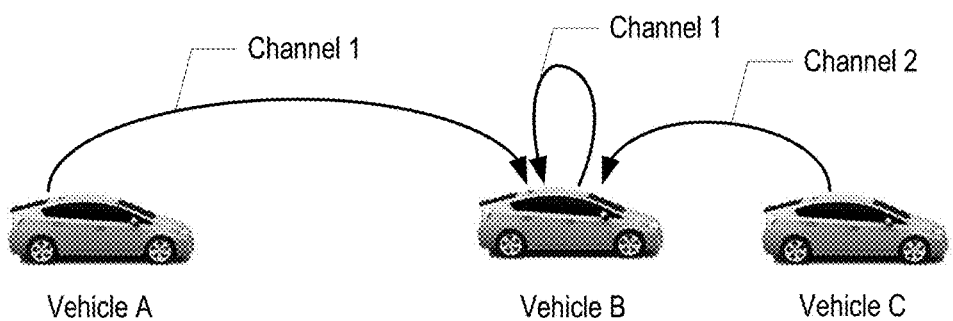
FIGS. 10A-10D are graphical representations illustrating an example of combination interference cancellation according to some embodiments.

An example of applying the cancellation sequence to reduce combination interference from a V2X message received on a vehicle is illustrated with reference to FIGS. 10A-10D. Turning to FIG. 10A, a vehicle B receives a first signal which carries information of a first V2X message from a vehicle A via a first channel (Channel 1). Simultaneously, the vehicle B receives a second signal which carries information of a second V2X message from a vehicle C via a second channel (Channel 2) and transmits a self-signal which carries information of a third V2X message via the first channel (Channel 1). The first signal may be referred to as the vehicle A's signal, and the second signal may be referred to as the vehicle C's signal. The vehicle A's signal, the vehicle C's signal and the vehicle B's self-signal can be signals using different V2X solutions or unlicensed band communication solutions.

Figure 10B:
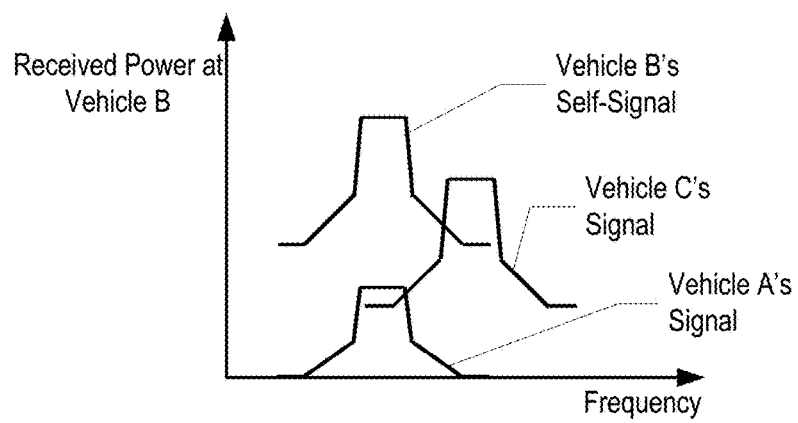

With reference to FIG. 10B, a RX signal on a receiver of the vehicle B can be measured (e.g., the RX signal may include the vehicle B's self-signal, the vehicle A's signal, and the vehicle C's signal). The vehicle C's signal has a signal strength stronger than that of the vehicle A's signal because the vehicle C is closer to the vehicle B than the vehicle A. Reception of the vehicle C's signal creates adjacent channel interference from Channel 2 to Channel 1. Meanwhile, the vehicle B's self-signal has a signal strength stronger than both of the vehicle A's signal and the vehicle C's signal. The transmission of the vehicle B's self-signal creates self-interference on both Channel 1 and Channel 2.

Figure 10C:
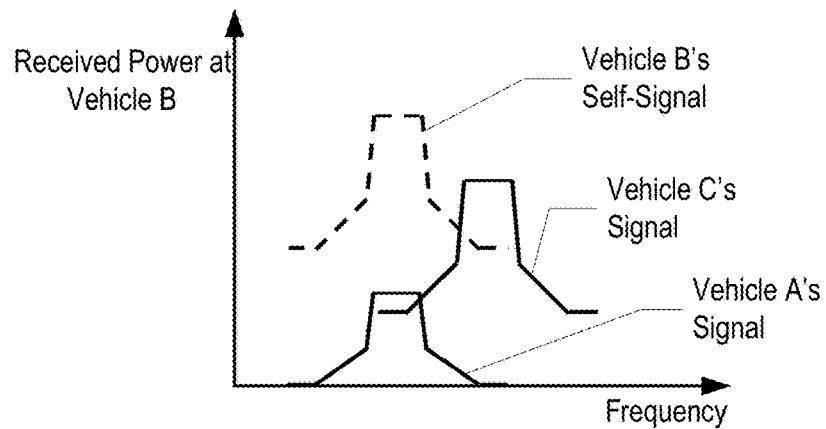
Figure 10D:
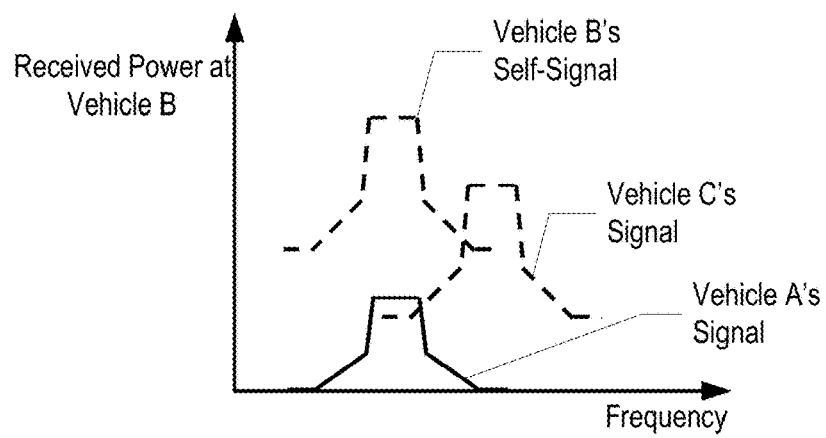

The self-interference created by the transmission of the vehicle B's self-signal can be reduced by applying the self-interference cancellation technique, description of which is not repeated here. For example, the cancellation module 208 de-modulates the vehicle B's self-signal which has the strongest strength from the RX signal; then the cancellation module 208 re-modulates and equalizes the vehicle B's self-signal obtained above and updates the RX signal by subtracting the equalized self-signal from the RX signal. For example, as shown in FIG. 10C, a sub-waveform of received power of the vehicle B's self-signal is subtracted from the waveform of received power at the receiver of the vehicle B, The adjacent channel interference created by the reception of the vehicle C's signal can be reduced by applying the adjacent-channel-interference cancellation technique, description of which is not repeated here. For example, the cancellation module 208 de-modulates the vehicle C's signal from the updated RX signal with the self-interference being already reduced; next, the cancellation module 208 re-modulates and de-equalizes the vehicle C's signal at the adjacent channel (Channel 2), and then updates the RX signal again by subtracting the vehicle C's signal from the RX signal. For example, as shown in FIG. 10D, besides the sub-waveform of received power of the vehicle B's self-signal, a sub-waveform of received power of the vehicle C's signal is also subtracted from the waveform of received power at the receiver of the vehicle B.

The cancellation module 208 de-modulates the updated RX signal on Channel 1, so as to generate the modified version of the first V2X message. The modified version of the first V2X message includes payload data which is substantially unobscured by the adjacent channel interference caused by the reception of the vehicle C's signal and the self-interference caused by the transmission of the vehicle B's self-signal.

Example System Architecture

Figure 11:
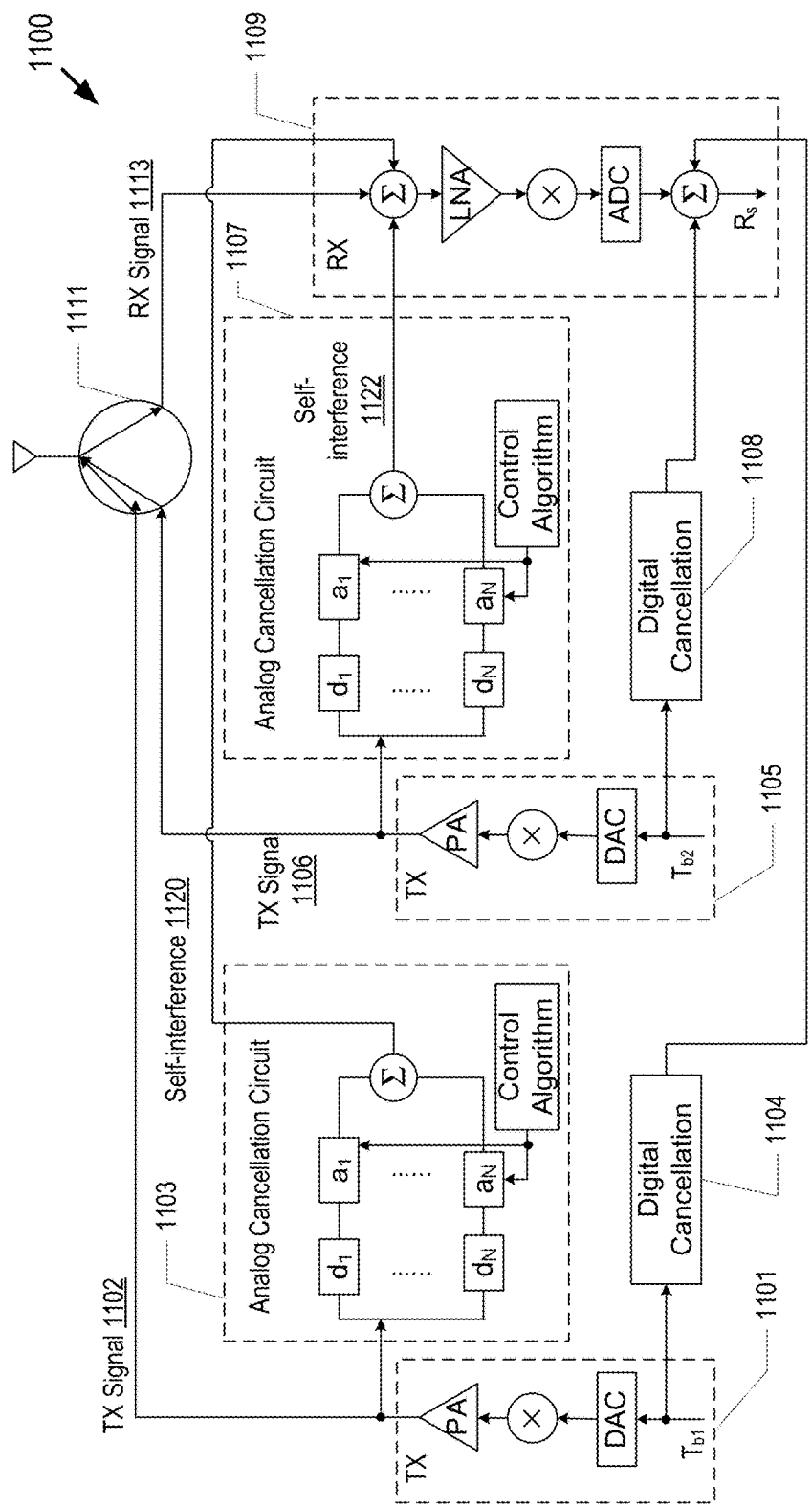
FIG. 11 is a block diagram illustrating an example system architecture for an interference reduction system according to some embodiments.

FIG. 11 is a block diagram illustrating an example system architecture 1100 for an interference reduction system according to some embodiments. The system architecture 1100 is illustrated with cancellation of self-interference from two in-vehicle self-interference channels by way of examples. It should be understood that the system architecture 1100 can include any number of in-vehicle self-interference channels. For simplicity and convenience of description, modulation and de-modulation of corresponding signals are not depicted in the figure.

A first transmission block for transmitting a self-signal $T_{b1}$ includes a transmitting circuit (TX) 1101, an analog cancellation circuit 1103 and a digital cancellation component 1104. The self-signal $T_{b1}$, which is a baseband signal, is processed by the transmitting circuit 1101 including a digital-to-analog converter (DAC) and a power amplifier (PA) to generate a first TX signal 1102. Then, the first TX signal 1102 reaches a circular 1111 for transmission through an antenna.

A second transmission block for transmitting a self-signal $T_{b2}$ includes a transmitting circuit (TX) 1105, an analog cancellation circuit 1107 and a digital cancellation component 1108. The self-signal $T_{b2}$, which is also a baseband signal, is processed by the transmitting circuit 1105 to generate a second TX signal 1106, and then the second TX signal 1106 reaches the circular 1111 for transmission through the antenna.

Meanwhile, a signal is also received by a receiving circuit (RX) 1109 via the antenna. The received signal (e.g., a RX signal 1113) includes information of a received V2X message which is corrupted by transmission of the first TX signal 1102 and the second TX signal 1106 via a first channel and a second channel respectively.

The analog cancellation circuit 1103 processes the first TX signal 1102 to generate a first self-interference signal 1120 which represents self-interference created by the transmission of the first TX signal 1102. For example, the analog cancellation circuit 1103 de-equalizes the first TX signal 1102 using a first set of fixed delays $d_1, \ldots, d_N$ and variable attenuators $a_1, \ldots, a_N$ to generate the first self-interference signal 1120. The fixed delays $d_1, \ldots, d_N$ and the variable attenuators $a_1, \ldots, a_N$ can be configured by a control algorithm. For example, the control algorithm determines values for the fixed delays $d_1, \ldots, d_N$ and the variable attenuators $a_1, \ldots, a_N$ based on channel properties associated with transmission of the first TX signal 1102. It is noted that modulation of the first TX signal 1102 is omitted in FIG. 11, and therefore corresponding demodulation does not need to be performed before the analog cancellation circuit 1103 processes the first TX signal 1102.

Similarly, the analog cancellation circuit 1107 processes the second TX signal 1106 to generate a second self-interference signal 1122 which represents self-interference created by the transmission of the second TX signal 1106. For example, the analog cancellation circuit 1107 de-equalizes the second TX signal 1102 using a second set of fixed delays $d_1, \ldots, d_N$ and variable attenuators $a_1, \ldots, a_N$ to generate the second self-interference signal 1122.

The receiving circuit 1109 subtracts the first self-interference signal 1120 and the second self-interference signal 1122 from the RX signal 1113, and then processes the RX signal using a low noise amplifier (LNA) and an analog-to-digital convertor (ADC). Next, the receiving circuit 1109 removes residual self-interference from an output of the ADC by subtracting a first residual self-interference signal received from a digital cancellation component 1104 and a second residual self-interference signal received from a digital cancellation component 1108.

In some embodiments, the digital cancellation component 1104 is used to determine the first residual self-interference signal related to the first self-signal $T_{b1}$, and the digital cancellation component 1108 is used to determine the second residual self-interference signal related to the second self-signal $T_{b2}$. The first residual self-interference signal and the second residual self-interference may include linear and non-linear distortion related to the first self-signal $T_{b1}$ and the second self-signal $T_{b2}$, respectively.

As a result, the receiving circuit 1109 generates an output signal $R_s$, which represents a modified version of the received V2X message. The modified version of the received V2X message includes payload data which is substantially unobscured by the self-interference from the two in-vehicle self-interference channels.

The system architecture 1100 can act as a full-duplex radio. Full-duplex communication typically includes a single radio being used to both transmit and receive messages with another entity, with the option to send and receive messages at the same time. By comparison, half-duplex communication does not include the option to send and receive messages at the same time.

To achieve full duplex, a radio has to completely cancel the self-interference that results from its own transmission of V2X messages. For example, WiFi signals are transmitted at 20 dBm (100 mW) average power, and the noise floor is around −90 dBm. Thus, the self-interference has to be reduced by 20 dBm−(−90 dBm)=110 dB to make it to the same level as the noise floor, which renders the self-interference negligible. If self-interference is not substantially reduced, any residual self-interference acts as noise to a received signal and reduces a signal-to-noise ratio (SNR), which results in throughput reduction. For example, if the received signal's SNR without full duplex is 25 dB but is reduced to 5 dB due to 20 dB residual self-interference, then the throughput with full duplex is that achieved using two 5 dB SNR links. This is significantly worse than using the original half duplex link with 25 dB SNR, and therefore it is better to turn off full duplex in this case. In other words, the amount of self-interference cancellation determines overall throughput and is a figure of merit for any full-duplex design.

The system architecture 1100 for the interference reduction system described herein includes structures for self-interference cancellation and enables full-duplex communication by a single V2X radio using different neighboring channels for transmission and reception. In this aspect, application of the interference reduction system described herein is particularly advantageous for DSRC messaging applications because of the DSRC protocol's inclusion of Basic Safety Messages being transmitted at regular short intervals (e.g., once every 0.10 seconds). However, it should be understood that application of the interference reduction system can also benefit any V2X communication that is negatively affected by adjacent channel interference, self-interference, and combination interference.

Figure 12:
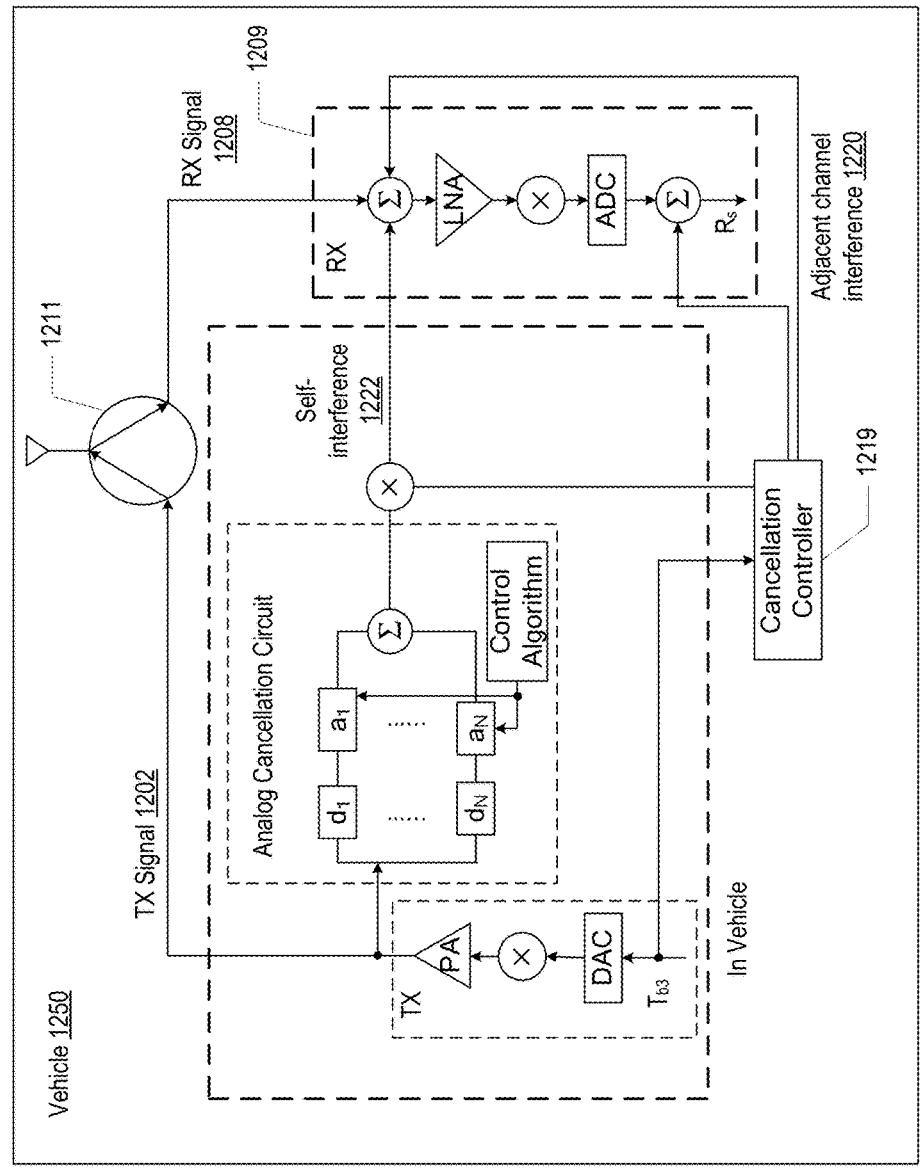
FIG. 12 is a block diagram illustrating another example system architecture for an interference reduction system according to some embodiments.
Figure 12:
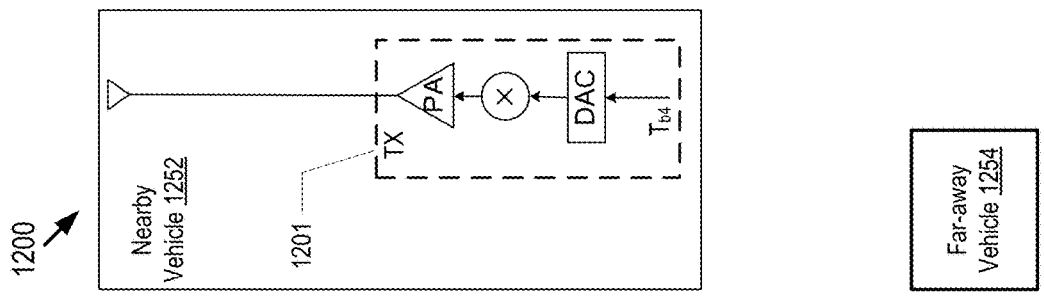

FIG. 12 is a block diagram illustrating another example system architecture 1200 for an interference reduction system according to some embodiments. The system architecture 1200 is illustrated with cancellation of self-interference from an in-vehicle self-interference channel and adjacent channel interference from an adjacent channel by way of examples. It should be understood that the system architecture 1200 can include any number of in-vehicle self-interference channels and any number of adjacent channels. For simplicity and convenience of description, modulation and de-modulation of corresponding signals are not depicted in the figure.

An in-vehicle transmission block for transmitting a self-signal $T_{b3}$ from a vehicle 1250 includes a transmitting circuit and an analog cancellation circuit. The self-signal $T_{b3}$, which is a baseband signal, is processed by the transmitting circuit to generate a TX signal 1202, and then the TX signal 1202 reaches a circular 1211 for transmission through an antenna. Detailed description for the in-vehicle transmission block for transmitting the self-signal $T_{b3}$ can be referred to in FIG. 11, which is not repeated here.

At a nearby vehicle 1252, a nearby-vehicle transmission block for transmitting a signal $T_{b4}$ to the vehicle 1250 includes a transmitting circuit (TX) 1201. The signal $T_{b4}$, which is also a baseband signal, is processed by the transmitting circuit 1201 and transmitted to the vehicle 1250 through an antenna. Simultaneously, at a far-away vehicle 1254, a baseband signal $T_{b5}$ is also transmitted to the vehicle 1250 through an antenna. The far-away vehicle 1254 may have a structure similar to the nearby vehicle 1252 or the vehicle 1250, and details of the far-away vehicle 1254 are not depicted in the figure.

At the vehicle 1250, a signal is received by a receiving circuit (RX) 1209 via an antenna. The received signal (e.g., a RX signal 1208) includes information of the signal $T_{b4}$ transmitted from the nearby vehicle 1252, information of the signal $T_{b5}$ transmitted from the far-away vehicle 1254 and self-interference caused by the transmission of the TX signal 1202. With respect to decoding the signal $T_{b5}$ (transmitted by the far-away vehicle 1254) from the RX signal, the reception of the signal $T_{b4}$ from the nearby vehicle 1252 generates adjacent channel interference, and the transmission of the TX signal 1202 generates self-interference.

A self-interference signal 1222 which represents self-interference created by the transmission of the TX signal 1202 is generated by an analog cancellation circuit, details of which can be referred to in FIG. 11. A cancellation controller 1219 generates an adjacent-channel-interference signal 1220, which represents adjacent channel interference created by the reception of the signal $T_{b4}$ from the nearby vehicle 1252, by performing operations similar to those described above in FIGS. 3-7.

The receiving circuit 1109 subtracts the self-interference signal 1222 and the adjacent-channel-interference signal 1220 from the RX signal 1208, and then processes the RX signal using an LNA and an ADC. Next, the receiving circuit 1209 removes residual interference from an output of the ADC by subtracting a residual interference signal obtained from the cancellation controller 1219. For example, the cancellation controller 1219 includes a digital cancellation component as depicted in FIG. 11 for the generation of the residual interference signal. The residual interference signal may include linear and non-linear distortion related to the self-signal $T_{b3}$, the signal $T_{b4}$ and the signal Tbs.

As a result, the receiving circuit 1209 generates an output signal $R_s$, which represents a version of the signal $T_{b5}$ including payload data which is substantially unobscured by the self-interference and the adjacent channel interference.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   detecting a presence of an interference signal on a channel of a Vehicle-to-Everything (V2X) radio which obscures payload data that is included in a V2X message received via the channel;
   determining that a source of the interference signal present on the channel is both on-board the V2X radio and off-board the V2X radio and that a type of the interference signal is combination interference;
   canceling out the interference signal from the V2X message to generate a modified version of the V2X message including the payload data which is substantially unobscured by the interference signal by:
      applying a self-interference cancellation technique to cancel out any self-interference from the V2X message;
      applying an adjacent-channel interference cancellation technique to cancel out any adjacent channel interference from the V2X message; and
      determining an execution order to cancel out the self-interference and the adjacent channel interference from the V2X message based on one or more order determination factors; and
   providing the modified version of the V2X message to a vehicle component so that the vehicle component provides its functionality based on the payload data and not the interference signal.

2. The method of claim 1, wherein the combination interference includes a combination of self-interference and adjacent channel interference.

3. The method of claim 2, wherein applying the self-interference cancellation technique includes:
   reducing or cancelling a self-interference waveform caused by the V2X message.

4. The method of claim 2, wherein applying the self-interference cancellation technique includes:
   measuring a receiver signal on a receiver of a vehicle;
   de-modulating a self signal on a transmission channel from the receiver signal, wherein the self signal causes the self-interference on the channel of the V2X message;
   re-modulating and de-equalizing the self signal to obtain an estimate of the self-interference;
   updating the receiver signal by removing the estimate of the self-interference from the receiver signal; and
   de-modulating the updated receiver signal.

5. The method of claim 2, wherein applying the adjacent channel interference includes:
   selecting an adjacent channel for decoding based on channel selection rules.

6. The method of claim 2, wherein applying the adjacent channel interference includes:
   measuring a receiver signal on a receiver of a vehicle;
   selecting an adjacent channel for decoding to reduce interference from the V2X message;
   decoding the receiver signal;
   identifying a protocol; and
   re-modulating the decoded receiver signal using the protocol.

7. The method of claim 6, wherein decoding the receiver signal includes using a first protocol, a second protocol, or an nth protocol and identifying the protocol includes identifying the first protocol, the second protocol, or the nth protocol based on decoding the receiver signal.

8. The method of claim 1, wherein
   when the execution order indicates to cancel out the self-interference prior to the adjacent channel interference, applying the self-interference cancellation technique to cancel out the self-interference from the V2X message to generate a first intermediate version of the V2X message, and applying the adjacent-channel interface cancellation technique to cancel out the adjacent channel interference from the first intermediate version of the V2X message to generate the modified version of the V2X message; and
   when the execution order indicates to cancel out the adjacent channel interference prior to the self-interference, applying the adjacent-channel interface cancellation technique to cancel out the adjacent channel interference from the V2X message to generate a second intermediate version of the V2X message, and applying the self-interference cancellation technique to cancel out the self-interference from the second intermediate version of the V2X message to generate the modified version of the V2X message.

9. The method of claim 8, wherein the one or more order determination factors include at least one of a strength of the self-interference, a strength of the adjacent channel interference, and a source of a maximal interference from the self-interference and the adjacent channel interference.

10. The method of claim 1, further comprising:
    analyzing interference cancellation performance associated with the V2X message;
    providing feedback data based on an analysis result of the interference cancellation performance; and
    updating the canceling out of the interference signal based on the feedback data.

11. A system comprising:
    a processor communicatively coupled to a Vehicle-to-Everything (V2X) radio and a non-transitory memory, wherein the V2X radio is operable to receive a V2X message on a channel of the V2X radio and the non-transitory memory stores computer code that is operable, when executed by the processor, to cause the processor to:
       detect a presence of an interference signal on the channel of the V2X radio which obscures payload data that is included in the V2X message received via the channel;
       determine that a source of the interference signal present on the channel is both on-board the V2X radio and off-board the V2X radio and that a type of the interference signal is combination interference;
       cancel out the interference signal from the V2X message to generate a modified version of the V2X message including the payload data which is substantially unobscured by the interference signal by:
          applying a self-interference cancellation technique to cancel out any self-interference from the V2X message;
          applying an adjacent-channel interference cancellation technique to cancel out any adjacent channel interference from the V2X message; and
          determining an execution order to cancel out the self-interference and the adjacent channel interference from the V2X message based on one or more order determination factors; and
       provide the modified version of the V2X message to a vehicle component so that the vehicle component provides its functionality based on the payload data and not the interference signal.

12. The system of claim 11, wherein combination interference includes a combination of self-interference and adjacent channel interference.

13. The system of claim 12, wherein applying the self-interference cancellation technique includes:
   reducing or cancelling a self-interference waveform caused by the V2X message.

14. The system of claim 12, wherein applying the self-interference cancellation technique includes:
   measuring a receiver signal on a receiver of a vehicle;
   de-modulating a self signal on a transmission channel from the receiver signal, wherein the self signal causes the self-interference on the channel of the V2X message;
   re-modulating and de-equalizing the self signal to obtain an estimate of the self-interference;
   updating the receiver signal by removing the estimate of the self-interference from the receiver signal; and
   de-modulating the updated receiver signal.

15. The system of claim 12, wherein applying the adjacent channel interference includes:
   selecting an adjacent channel for decoding based on channel selection rules.

16. A computer program product embodied on a non-transitory computer readable medium comprising instructions that, when executed by a processor, causes the processor to perform operations comprising:
   detecting a presence of an interference signal on a channel of a Vehicle-to-Everything (V2X) radio which obscures payload data that is included in a V2X message received via the channel;
   determining that a source of the interference signal present on the channel is both on-board the V2X radio and off-board the V2X radio and that a type of the interference signal is combination interference;
   canceling out the interference signal from the V2X message to generate a modified version of the V2X message including the payload data which is substantially unobscured by the interference signal by:
      applying a self-interference cancellation technique to cancel out any self-interference from the V2X message;
      applying an adjacent-channel interference cancellation technique to cancel out any adjacent channel interference from the V2X message; and
      determining an execution order to cancel out the self-interference and the adjacent channel interference from the V2X message based on one or more order determination factors; and
   providing the modified version of the V2X message to a vehicle component so that the vehicle component provides its functionality based on the payload data and not the interference signal.

17. The computer program product of claim 16, wherein combination interference includes a combination of self-interference and adjacent channel interference.

18. The computer program product of claim 17, wherein applying the self-interference cancellation technique includes:
   reducing or cancelling a self-interference waveform caused by the V2X message.

19. The computer program product of claim 17, wherein applying the self-interference cancellation technique includes:
   measuring a receiver signal on a receiver of a vehicle;
   de-modulating a self signal on a transmission channel from the receiver signal, wherein the self signal causes the self-interference on the channel of the V2X message;
   re-modulating and de-equalizing the self signal to obtain an estimate of the self-interference;
   updating the receiver signal by removing the estimate of the self-interference from the receiver signal; and
   de-modulating the updated receiver signal.

20. The computer program product of claim 17, wherein applying the adjacent channel interference includes:
   selecting an adjacent channel for decoding based on channel selection rules.

* * * * *